United States Patent
Wang et al.

(10) Patent No.: US 12,192,490 B2
(45) Date of Patent: Jan. 7, 2025

(54) PICTURES WITH MIXED NAL UNIT TYPES

(71) Applicant: Huawei Technologies Co., Ltd., Shenzhen (CN)

(72) Inventors: Ye-Kui Wang, San Diego, CA (US); Fnu Hendry, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 189 days.

(21) Appl. No.: 17/471,066

(22) Filed: Sep. 9, 2021

(65) Prior Publication Data

US 2021/0409733 A1 Dec. 30, 2021

Related U.S. Application Data

(63) Continuation of application No. PCT/US2020/022136, filed on Mar. 11, 2020.
(Continued)

(51) Int. Cl.
*H04N 19/169* (2014.01)
*H04N 19/105* (2014.01)
(Continued)

(52) U.S. Cl.
CPC ......... *H04N 19/188* (2014.11); *H04N 19/105* (2014.11); *H04N 19/159* (2014.11);
(Continued)

(58) Field of Classification Search
CPC .. H04N 19/105; H04N 19/159; H04N 19/169; H04N 19/172; H04N 19/184;
(Continued)

(56) References Cited

U.S. PATENT DOCUMENTS

2007/0223595 A1 9/2007 Hannuksela et al.
2013/0028315 A1 1/2013 Park et al.
(Continued)

FOREIGN PATENT DOCUMENTS

CN 105122815 A 12/2015
CN 105379271 A 3/2016
(Continued)

OTHER PUBLICATIONS

Wang, Y.K., et al.,:"AHG12: On mixed NAL unit types within a picture", Document: JVET-O0140-v1, Joint Video Experts Team (JVET) of ITU-T SG 16 WP 3 and ISO/IEC JTC 1/SC 29/WG 11,15th Meeting: Gothenburg, SE, Jul. 3-12, 2019, 3 pages.
(Continued)

*Primary Examiner* — Maria E Vazquez Colon
(74) *Attorney, Agent, or Firm* — Conley Rose, P.C.

(57) ABSTRACT

A video coding mechanism is disclosed. The mechanism includes receiving a bitstream comprising a plurality of sub-pictures associated with a picture and a flag. The sub-pictures are contained in a plurality of video coding layer (VCL) network abstraction layer (NAL) units. A NAL unit type value is the same for all VCL NAL units associated with the picture when the flag is set to a first value. When the flag is set to a second value, a first NAL unit type value for VCL NAL units containing one or more of the sub-pictures of the picture is different than a second NAL unit type value for VCL NAL units containing one or more of the sub-pictures of the picture. The sub-pictures are decoded based on the NAL unit type values. The sub-pictures are forwarded for display as part of a decoded video sequence.

22 Claims, 11 Drawing Sheets

US 12,192,490 B2
Page 2

Related U.S. Application Data

(60) Provisional application No. 62/816,749, filed on Mar. 11, 2019, provisional application No. 62/832,132, filed on Apr. 10, 2019.

(51) Int. Cl.
| | |
|---|---|
| *H04N 19/159* | (2014.01) |
| *H04N 19/172* | (2014.01) |
| *H04N 19/196* | (2014.01) |
| *H04N 19/433* | (2014.01) |
| *H04N 19/44* | (2014.01) |
| *H04N 19/70* | (2014.01) |

(52) U.S. Cl.
CPC ......... *H04N 19/172* (2014.11); *H04N 19/196* (2014.11); *H04N 19/433* (2014.11); *H04N 19/44* (2014.11); *H04N 19/70* (2014.11)

(58) Field of Classification Search
CPC .. H04N 19/188; H04N 19/196; H04N 19/433; H04N 19/44; H04N 19/503; H04N 19/593; H04N 19/597; H04N 19/70; H04N 19/91
See application file for complete search history.

(56) References Cited

U.S. PATENT DOCUMENTS

| | | | |
|---|---|---|---|
| 2013/0114694 | A1 | 5/2013 | Chen et al. |
| 2014/0092995 | A1 | 4/2014 | Deshpande |
| 2014/0218473 | A1 | 8/2014 | Hannuksela et al. |
| 2014/0301451 | A1 | 10/2014 | Deshpande |
| 2014/0301463 | A1 | 10/2014 | Rusanovskyy et al. |
| 2014/0301477 | A1 | 10/2014 | Deshpande |
| 2014/0301485 | A1 | 10/2014 | Ramasubramonian et al. |
| 2016/0381385 | A1 | 12/2016 | Ugur |
| 2017/0324981 | A1 | 11/2017 | Deshpande |
| 2019/0238849 | A1* | 8/2019 | Fang ................. H04N 19/124 |
| 2019/0373287 | A1 | 12/2019 | Lim et al. |
| 2021/0176491 | A1* | 6/2021 | Wu ...................... H04L 69/22 |
| 2021/0329263 | A1 | 10/2021 | Hendry et al. |
| 2021/0360291 | A1* | 11/2021 | Skupin ................ H04N 19/107 |
| 2021/0392361 | A1* | 12/2021 | Hendry .............. H04N 19/188 |
| 2022/0078486 | A1* | 3/2022 | Hannuksela ....... H04N 21/2393 |

FOREIGN PATENT DOCUMENTS

| | | |
|---|---|---|
| CN | 105556965 A | 5/2016 |
| CN | 105900427 A | 8/2016 |
| CN | 108718414 A | 10/2018 |
| EP | 3906685 A1 | 11/2021 |
| EP | 3925212 A1 | 12/2021 |
| WO | 2020142704 A1 | 7/2020 |
| WO | 2020157287 A1 | 8/2020 |
| WO | 2020185922 A1 | 9/2020 |

OTHER PUBLICATIONS

Wang, Y.K., et al., "AHG12: Allowing mixed IRAP and non-IRAP NAL unit types within a picture", Document: JVET-N0108-v1, Joint Video Experts Team (JVET) of ITU-T SG 16 WP 3 and ISO/IEC JTC 1/SC 29/WG 11,14th Meeting: Geneva, CH, Mar. 19-27, 2019, 3 pages.

Hannuksela, M., et al., "Use cases and proposed design choices for adaptive resolution changing (ARC)", Document: JVET-M0259, Joint Video Experts Team (JVET) of ITU-T SG 16 WP 3 and ISO/IEC JTC 1/SC 29/WG 11,13th Meeting: Marrakech, MA, Jan. 9-18, 2019, 10 pages.

Document: JVET-M0131-v1, Wang, Y.K., et al, "AHG17: On NAL unit types for IRAP pictures and leading pictures," Joint Video Experts Team (JVET) of ITU-T SG 16 WP 3 and ISO/IEC JTC 1/SC 29/WG 11, 13th Meeting: Marrakech, MA, Jan. 9-18, 2019, 3 pages.

JCTVC-AC1005-v21, "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11, 29th Meeting: Macao, CN, Oct. 19-25, 2017, 56 pages.

JVET-M0261, "AHG12: On grouping of tiles," Joint Video Experts Team (JVET) of ITU-T SG 16 WP 3 and ISO/IEC JTC 1/SC 29/WG 11, 13th Meeting: Marrakech, MA, Jan. 9-18, 2019, 11 pages.

JVET-M0388, "AHG12/AHG17: On merging of MCTSs for viewport-dependent streaming," Joint Video Experts Team (JVET) of ITU-T SG 16 WP 3 and ISO/IEC JTC 1/SC 29/WG 11, 13th Meeting: Marrakech, MA, Jan. 9-18, 2019, 5 pages.

JVET-M1001-v6, "Versatile Video Coding (Draft 4)," Joint Video Experts Team (JVET) of ITU-T SG 16 WP 3 and ISO/IEC JTC 1/SC 29/WG 11, 13th Meeting: Marrakech, MA, Jan. 9-18, 2019, 298 pages.

"Line Transmission of Non-Telephone Signals Video Codec for Audiovisual Services AT p x 64 kbits," ITU-T Recommendation H.261, Mar. 1993, 29 pages.

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

Document: JVET-M0161-v1, Lulin Chen, et al., "AHG17: Signalling random access properties in the NAL unitheader," Joint Video Experts Team (JVET) of ITU-T SG 16 WP 3 and ISO/IEC JTC 1/SC 29/WG 11, 13th Meeting: Marrakech, MA, Jan. 9-18, 2019, 5 pages.

Document: JVET-O0140-v2, Ye-Kui Wang, et al., "AHG12: On mixed NAL unit types within a picture," Joint Video Experts Team (JVET) of ITU-T SG 16 WP 3 and ISO/IEC JTC 1/SC 29/WG 11, 15th Meeting: Gothenburg, SE, Jul. 3-12, 2019, 3 pages.

Document: JVET-M0261, Miska M et al.,"AHG12: On grouping of tiles," Joint Video Experts Team (JVET) of ITU-T SG 16 WP 3 and ISO/IEC JTC 1/SC 29/WG 11, 13th Meeting: Marrakech, MA, Jan. 9-18, 2019, 11 pages.

* cited by examiner

PICTURES WITH MIXED NAL UNIT TYPES

CROSS-REFERENCE TO RELATED APPLICATIONS

This patent application is a continuation of International Application No. PCT/US2020/022136, filed Mar. 11, 2020 by Ye-Kui Wang, et. al., and titled "Pictures with Mixed NAL Unit Types," which claims the benefit of U.S. Provisional Patent Application No. 62/816,749, filed Mar. 11, 2019 by Ye-Kui Wang, et. al., and titled "Support Of Mixed NAL Unit Types Within One Picture In Video Coding," and U.S. Provisional Patent Application No. 62/832,132, filed Apr. 10, 2019 by Ye-Kui Wang, et. al., and titled "Support Of Mixed NAL Unit Types Within One Picture In Video Coding," which are hereby incorporated by reference.

TECHNICAL FIELD

The present disclosure is generally related to video coding, and is specifically related to coding sub-pictures of pictures in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a decoder, the method comprising: receiving, by a receiver of the decoder, a bitstream comprising a plurality of sub-pictures associated with a picture and a flag, wherein the sub-pictures are contained in video coding layer (VCL) network abstraction layer (NAL) units; determining, by the processor, a first NAL unit type value is the same for all of the VCL NAL units associated with the picture when the flag is set to a first value; determining, by the processor, a first NAL unit type value for the VCL NAL units containing one or more of the sub-pictures of the picture is different than a second NAL unit type value for VCL NAL units containing one or more of the sub-pictures of the picture when the flag is set to a second value; and decoding, by the processor, one or more of the sub-pictures based on the first NAL unit type value or the second NAL unit type value.

A picture can be partitioned into multiple sub-pictures. Such sub-pictures can be coded into separate sub-bitstreams, which can then be merged into a bitstream for transmission to a decoder. For example, sub-pictures may be employed for virtual reality (VR) applications. As a specific example, a user may only view a portion of a VR picture at any time. Accordingly, different sub-pictures may be transmitted at different resolutions so that more bandwidth can be allocated to sub-pictures that are likely to be displayed and sub-pictures that are unlikely to be displayed can be compressed to increase coding efficiency. Further, video streams may be encoded by using intra-random access point (IRAP) pictures. An IRAP picture is coded according to intra-prediction and can be decoded without reference to other pictures. Non-IRAP pictures may be coded according to inter-prediction and can be decoded by referencing other pictures. Non-IRAP pictures are significantly more condensed than IRAP pictures. However, a video sequence must begin decoding with an IRAP picture as the IRAP picture contains sufficient data to be decoded without referencing other pictures. IRAP pictures can be used in sub-pictures, and can allow for dynamic resolution changes. Accordingly, a video system may transmit more IRAP pictures for sub-pictures that are more likely to be viewed (e.g., based on the users current viewport) and fewer TRAP pictures for sub-pictures that are unlikely to be viewed in order to further increase coding efficiency. However, sub-pictures are part of the same picture. Accordingly, this scheme may result in a picture that contains both an TRAP sub-picture and a non-IRAP sub-picture. Some video systems are not equipped to handle a mixed picture with both IRAP and non-IRAP regions. The present disclosure includes a flag that indicates whether a picture is mixed and hence contains both TRAP and non-IRAP components. Based on this flag, the decoder can treat different sub-pictures differently when decoding in order to properly decode and display the picture/sub-pictures. This flag may be stored in a PPS and may be referred to as a mixed_nalu_types_in_pic_flag. As such, the disclosed mechanisms allow for the implementation of additional functionality. Further, the disclosed mechanisms allow for dynamic resolution changes when employing sub-picture bitstreams. Hence, the disclosed mechanisms allow for lower resolution sub-picture bitstreams to be transmitted when streaming VR video without significantly impairing user experience. As such, the disclosed mechanisms increase coding efficiency, and hence reduce the usage of network resources, memory resources, and/or processing resources at the encoder and the decoder.

Optionally, in any of the preceding aspects, another implementation of the aspect provides, wherein the bitstream includes a picture parameter set (PPS) including the flag.

Optionally, in any of the preceding aspects, another implementation of the aspect provides, wherein the first NAL unit type value indicates the picture contains an intra-random access point (IRAP) sub-picture, and wherein the second NAL unit type value indicates the picture contains a non-IRAP sub-picture.

Optionally, in any of the preceding aspects, another implementation of the aspect provides, wherein the first NAL unit type value is equal to Instantaneous Decoding Refresh (IDR) with random access decodable leading picture (IDR_W_RADL), IDR with no leading pictures (IDR_N_LP), or clean random access (CRA) NAL unit type (CRA_NUT).

Optionally, in any of the preceding aspects, another implementation of the aspect provides, wherein the second NAL unit type value is equal to trailing picture NAL unit type (TRAIL_NUT), random access decodable leading picture NAL unit type (RADL_NUT), or random access skipped leading picture (RASL) NAL unit type (RASL_NUT).

Optionally, in any of the preceding aspects, another implementation of the aspect provides, wherein the flag is a mixed_nalu_types_in_pic_flag.

Optionally, in any of the preceding aspects, another implementation of the aspect provides, wherein the mixed_nalu_types_in_pic_flag is equal to one when specifying that the picture referring to the PPS has more than one of the VCL NAL units and the VCL NAL units do not have the same value of NAL unit type (nal_unit_type), and wherein mixed_nalu_types_in_pic_flag is equal to zero when specifying the picture referring to the PPS has one or more of the VCL NAL units and the VCL NAL units have the same value of nal_unit_type.

In an embodiment, the disclosure includes a method implemented in an encoder, the method comprising: determining, by the processor, whether a picture contains a plurality of sub-pictures of different types; encoding, by the processor, the sub-pictures of the picture into a plurality of VCL NAL units in a bitstream; encoding into the bitstream, by the processor, a flag set to a first value when a first NAL unit type value is the same for all VCL NAL units associated with the picture and set to a second value when the first NAL unit type value for VCL NAL units containing one or more of the sub-pictures of the picture is different than a second NAL unit type value for VCL NAL units containing one or more of the sub-pictures of the picture; and storing, by a memory coupled to the processor, the bitstream for communication toward a decoder.

A picture can be partitioned into multiple sub-pictures. Such sub-pictures can be coded into separate sub-bitstreams, which can then be merged into a bitstream for transmission to a decoder. For example, sub-pictures may be employed for virtual reality (VR) applications. As a specific example, a user may only view a portion of a VR picture at any time. Accordingly, different sub-pictures may be transmitted at different resolutions so that more bandwidth can be allocated to sub-pictures that are likely to be displayed and sub-pictures that are unlikely to be displayed can be compressed to increase coding efficiency. Further, video streams may be encoded by using intra-random access point (IRAP) pictures. An IRAP picture is coded according to intra-prediction and can be decoded without reference to other pictures. Non-IRAP pictures may be coded according to inter-prediction and can be decoded by referencing other pictures. Non-IRAP pictures are significantly more condensed than IRAP pictures. However, a video sequence must begin decoding with an IRAP picture as the IRAP picture contains sufficient data to be decoded without referencing other pictures. IRAP pictures can be used in sub-pictures, and can allow for dynamic resolution changes. Accordingly, a video system may transmit more IRAP pictures for sub-pictures that are more likely to be viewed (e.g., based on the users current viewport) and fewer TRAP pictures for sub-pictures that are unlikely to be viewed in order to further increase coding efficiency. However, sub-pictures are part of the same picture. Accordingly, this scheme may result in a picture that contains both an TRAP sub-picture and a non-IRAP sub-picture. Some video systems are not equipped to handle a mixed picture with both IRAP and non-IRAP regions. The present disclosure includes a flag that indicates whether a picture is mixed and hence contains both TRAP and non-IRAP components. Based on this flag, the decoder can treat different sub-pictures differently when decoding in order to properly decode and display the picture/sub-pictures. This flag may be stored in a PPS and may be referred to as a mixed_nalu_types_in_pic_flag. As such, the disclosed mechanisms allow for the implementation of additional functionality. Further, the disclosed mechanisms allow for dynamic resolution changes when employing sub-picture bitstreams. Hence, the disclosed mechanisms allow for lower resolution sub-picture bitstreams to be transmitted when streaming VR video without significantly impairing user experience. As such, the disclosed mechanisms increase coding efficiency, and hence reduce the usage of network resources, memory resources, and/or processing resources at the encoder and the decoder.

Optionally, in any of the preceding aspects, another implementation of the aspect provides, further comprising encoding a PPS into the bitstream, wherein the flag is encoded into the PPS.

Optionally, in any of the preceding aspects, another implementation of the aspect provides, wherein the first NAL unit type value indicates the picture contains an TRAP sub-picture, and wherein the second NAL unit type value indicates the picture contains a non-IRAP sub-picture.

Optionally, in any of the preceding aspects, another implementation of the aspect provides, wherein the first NAL unit type value is equal to IDR_W_RADL, IDR_N_LP, or CRA_NUT.

Optionally, in any of the preceding aspects, another implementation of the aspect provides, wherein the second NAL unit type value is equal to TRAIL_NUT, RADL_NUT, or RASL_NUT.

Optionally, in any of the preceding aspects, another implementation of the aspect provides, wherein the flag is a mixed_nalu_types_in_pic_flag.

Optionally, in any of the preceding aspects, another implementation of the aspect provides, wherein the mixed_nalu_types_in_pic_flag is equal to one when specifying that the picture referring to the PPS has more than one of the VCL NAL units and the VCL NAL units do not have the same value of nal_unit_type, and wherein mixed_nalu_types_in_pic_flag is equal to zero when specifying the picture referring to the PPS has one or more of the VCL NAL units and the VCL NAL units have the same value of nal_unit_type.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising a plurality of sub-pictures associated with a picture and a flag, wherein the sub-pictures are contained in a plurality of VCL NAL units; a determining means for: determining a first NAL unit type value is the same for all VCL NAL units associated with the picture when the flag is set to a first value; and determining a first NAL unit type value for VCL NAL units containing one or more of the sub-pictures of the picture is different than a second NAL unit type value for VCL NAL units containing one or more of the sub-pictures of the picture when the flag is set to a second value; and a decoding means for decoding one or more of the sub-pictures based on the first NAL unit type value or the second NAL unit type value.

Optionally, in any of the preceding aspects, another implementation of the aspect provides, wherein the decoder is further configured to perform the method of any of the preceding aspects.

In an embodiment, the disclosure includes an encoder comprising: a determining means for determining whether a picture contains a plurality of sub-pictures of different types; an encoding means for: encoding the sub-pictures of the picture into a plurality of VCL NAL units in a bitstream; and encoding into the bitstream a flag set to a first value when a first NAL unit type value is the same for all VCL NAL units associated with the picture and set to a second value when a first NAL unit type value for VCL NAL units containing one or more of the sub-pictures of the picture is different than a second NAL unit type value for VCL NAL units containing one or more of the sub-pictures of the picture; and a storing means for storing the bitstream for communication toward a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
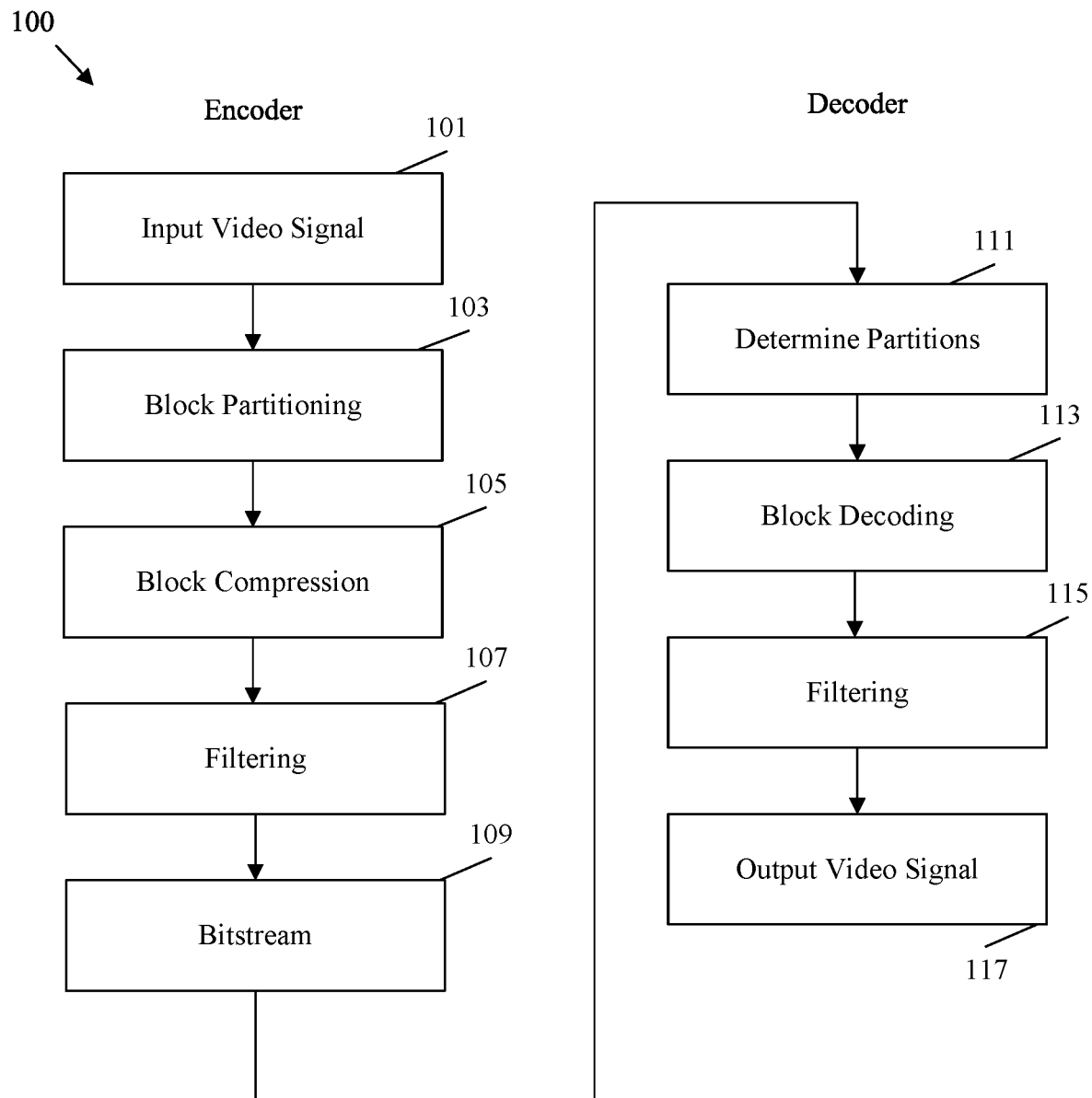
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following acronyms are used herein, Coded Video Sequence (CVS), Decoded Picture Buffer (DPB), Instantaneous Decoding Refresh (IDR), Intra-Random Access Point (IRAP), Least Significant Bit (LSB), Most Significant Bit (MSB), Network Abstraction Layer (NAL), Picture Order Count (POC), Raw Byte Sequence Payload (RBSP), Sequence Parameter Set (SPS), and Working Draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-M1001-v6 which provides an algorithm description, an encoder-side description of the VVC WD, and reference software.

Video coding systems may encode video by employing IRAP pictures and non-IRAP pictures. IRAP pictures are pictures coded according to intra-prediction that serve as random access points for a video sequence. In intra-prediction, blocks of a picture are coded by reference to other blocks in the same picture. This is in contrast to non-IRAP pictures that employ inter-prediction. In inter-prediction, blocks of a current picture are coded by reference to other blocks in a reference picture that is different from the current picture. Since an IRAP picture is coded without reference to other pictures, the IRAP picture can be decoded without first decoding any other pictures. Accordingly, a decoder can begin decoding a video sequence at any IRAP picture. In contrast, a non-IRAP picture is coded in reference to other pictures, and hence a decoder is generally unable to begin decoding a video sequence at a non-IRAP picture. IRAP pictures also refresh the DPB. This is because the IRAP picture is a starting point for a CVS, and pictures in the CVS do not refer to pictures in the prior CVS. As such, IRAP pictures can also stop inter-prediction related coding errors because such errors cannot propagate through the IRAP picture. However, IRAP pictures are significantly larger than non-IRAP pictures from a data size standpoint. As such, a video sequence generally includes many non-IRAP pictures with a smaller number of interspersed IRAP pictures to balance coding efficiency with functionality. For example, a sixty frame CVS may include one IRAP picture and fifty nine non-IRAP pictures.

In some cases, video coding systems may be employed to code virtual reality (VR) video, which may also be referred to as 360 degree video. A VR video may include a sphere of video content displayed as if the user is in the center of the sphere. Only a portion of the sphere, referred to as a viewport, is displayed to the user. For example, the user may employ a head mounted display (HMD) that selects and displays a viewport of the sphere based on the user's head movement. This provides the impression of being physically present in a virtual space as depicted by the video. In order to accomplish this result, each picture of the video sequence includes an entire sphere of video data at a corresponding instant in time. However, only a small portion (e.g., a single viewport) of the picture is displayed to the user. The remainder of the picture is discarded without being rendered. The entire picture is generally transmitted so that a different viewport can be dynamically selected and displayed in response to the users head movement. This approach may result in very large video file sizes.

In order to improve coding efficiency, some systems divide the pictures into sub-pictures. A sub-picture is a defined spatial region of a picture. Each sub-picture contains a corresponding viewport of the picture. The video can be encoded at two or more resolutions. Each resolution is encoded into a different sub-bitstream. When a user streams the VR video, the coding system can merge the sub-bitstreams into a bitstream for transmission based on the current viewport in use by the user. Specifically, the current viewport is obtained from the high resolution sub-bitstream and the viewports that are not being viewed are obtained from the low resolution bitstream(s). In this way, the highest quality video is displayed to the user and the lower quality video is discarded. In the event the user selects a new viewport, the lower resolution video is presented to the user. The decoder can request that the new viewport receive the higher resolution video. The encoder can then alter the merging process accordingly. Once an IRAP picture is reached, the decoder can begin decoding the higher resolution video sequence at the new viewport. This approach significantly increases video compression without negatively impacting the user's viewing experience.

One concern with the abovementioned approach is that the length of time needed to change resolutions is based on the length of time until an IRAP picture is reached. This is because the decoder is unable to begin decoding a different video sequence at a non-IRAP picture as described above. One approach to reduce such latency is to include more IRAP pictures. However, this results in an increase in file size. In order to balance functionality with coding efficiency, different viewports/sub-pictures may include IRAP pictures at different frequencies. For example, viewports that are more likely to be viewed may have more IRAP pictures than other viewports. For example, in a basketball context, the viewports related to the baskets and/or center court may include IRAP pictures at a greater frequency than viewports that view the stands or the ceiling as such viewports are less likely to be viewed by the user.

This approach leads to other problems. Specifically, the sub-pictures that contain the viewports are part of a single picture. When different sub-pictures have IRAP pictures at different frequencies, some of the pictures include both IRAP sub-pictures and non-IRAP sub-pictures. This is a problem because pictures are stored in a bitstream by employing NAL units. A NAL unit is a storage unit that contains a parameter set or a slice of a picture and a corresponding slice header. An access unit is a unit that contains an entire picture. As such, an access unit contains all of the NAL units related to the picture. NAL units also contain a type that indicates the type of picture that includes the slice. In some video systems, all NAL units related to a single picture (e.g., included in the same access unit) are required to have the same type. As such, the NAL unit storage mechanism may cease to operate correctly when a picture includes both IRAP sub-pictures and non-IRAP sub-pictures.

Disclosed herein are mechanisms to adjust the NAL storage scheme to support pictures that include both IRAP sub-pictures and non-IRAP sub-pictures. This in turn allows for VR video that includes differing IRAP sub-picture frequencies for different viewports. In a first example, disclosed herein is a flag that indicates whether a picture is mixed. For example, the flag may indicate that the picture contains both TRAP and non-IRAP sub-pictures. Based on this flag, the decoder can treat different types of sub-pictures differently when decoding in order to properly decode and display the picture/sub-pictures. This flag may be stored in a picture parameter set (PPS) and may be referred to as a mixed_nalu_types_in_pic_flag.

In a second example, disclosed herein is a flag that indicates whether a picture is mixed. For example, the flag may indicate that the picture contains both IRAP and non-IRAP sub-pictures. Further, the flag constrains the picture such that the mixed picture contains exactly two NAL unit types including one IRAP type and one non-IRAP type. For example, the picture may contain IRAP NAL units including one and only one of instantaneous decoding refresh (IDR) with random access decodable leading picture (IDR_W_RADL), IDR with no leading pictures (IDR_N_LP), or clean random access (CRA) NAL unit type (CRA_NUT). Further, the picture may contain non-IRAP NAL units including one and only one of trailing picture NAL unit type (TRAIL_NUT), random access decodable leading picture NAL unit type (RADL_NUT), or random access skipped leading picture (RASL) NAL unit type (RASL_NUT). Based on this flag, the decoder can treat different sub-pictures differently when decoding in order to properly decode and display the picture/sub-pictures. This flag may be stored in a PPS and may be referred to as a mixed_nalu_types_in_pic_flag.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

Figure 2:
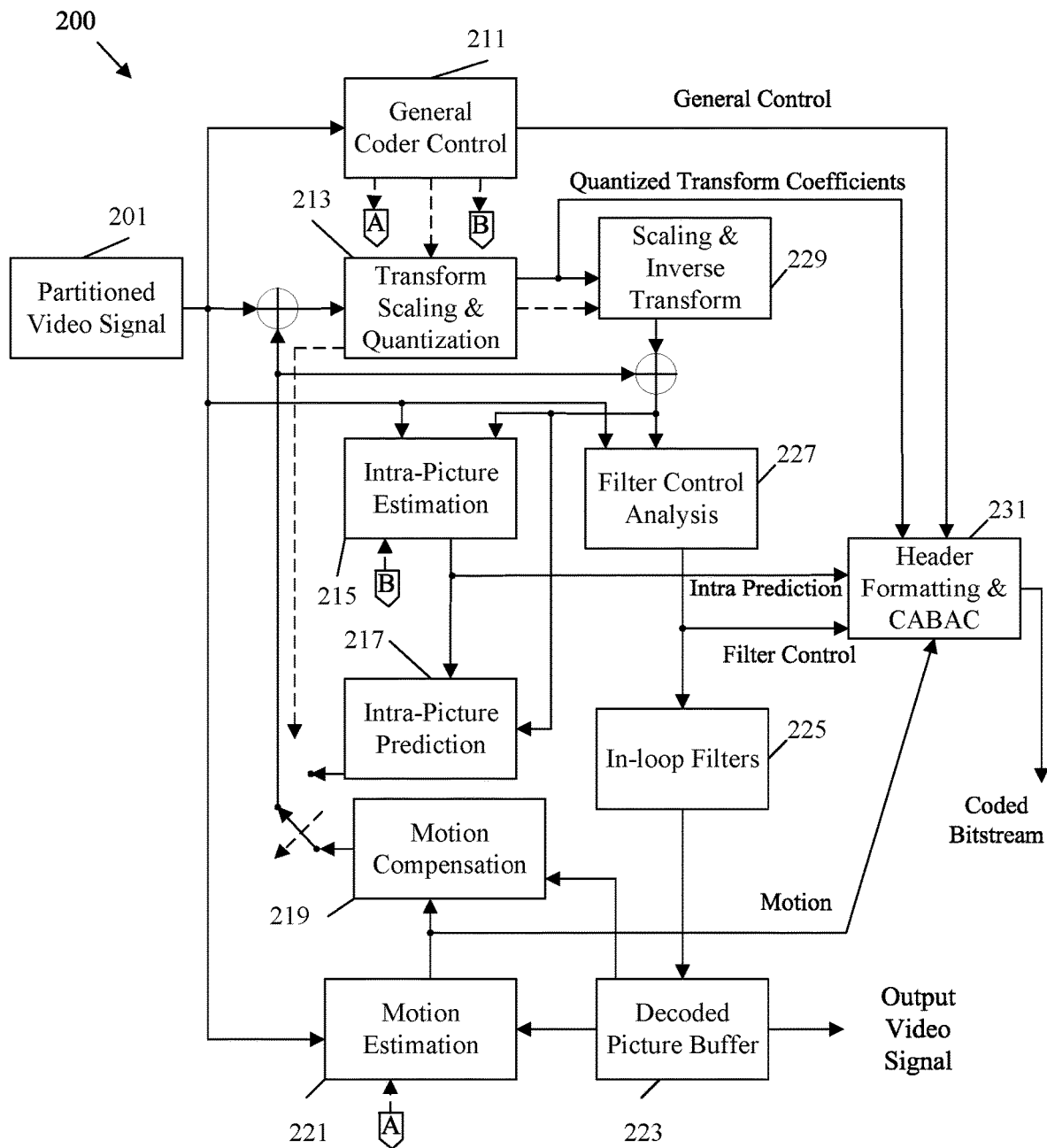
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
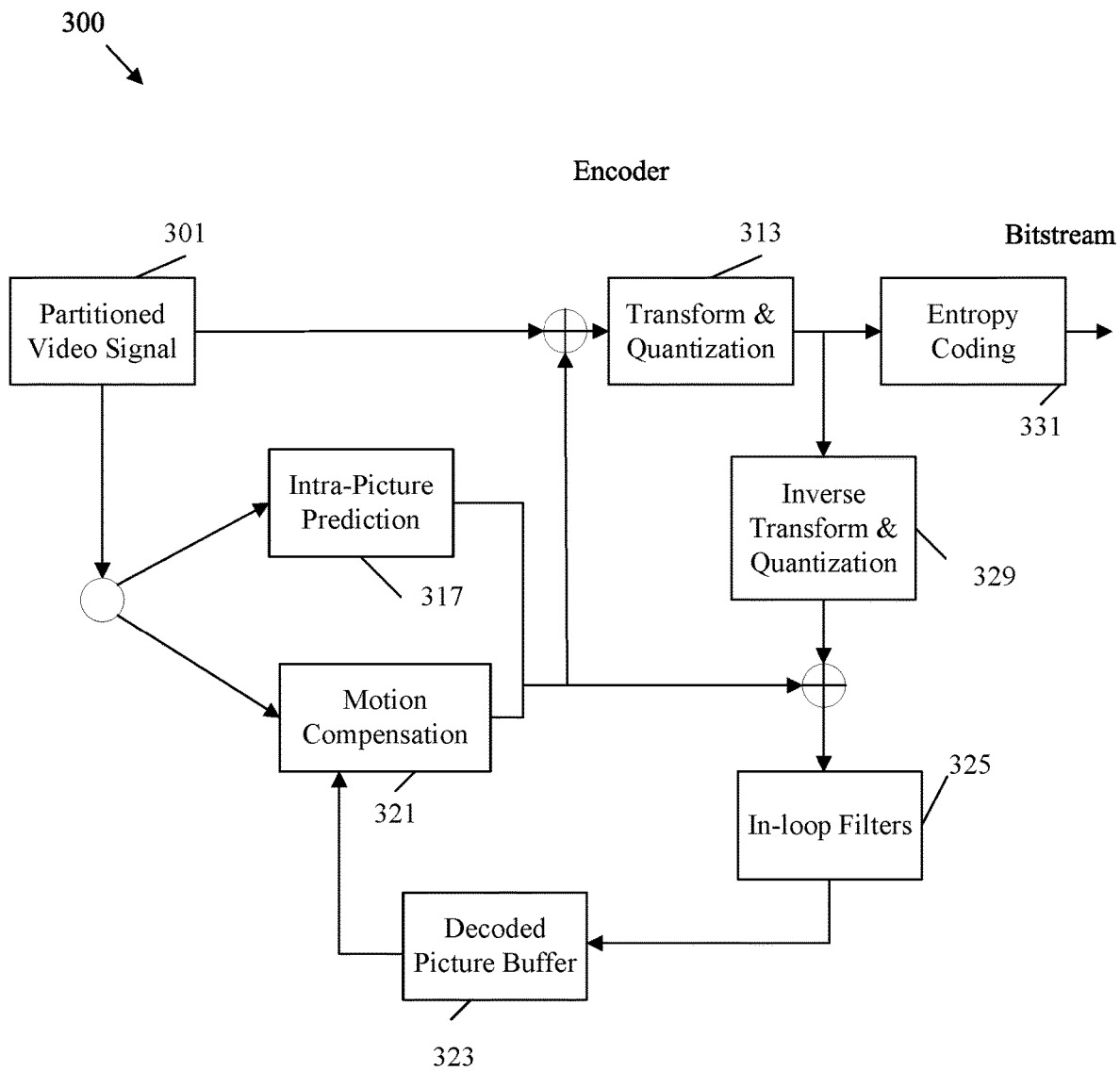
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
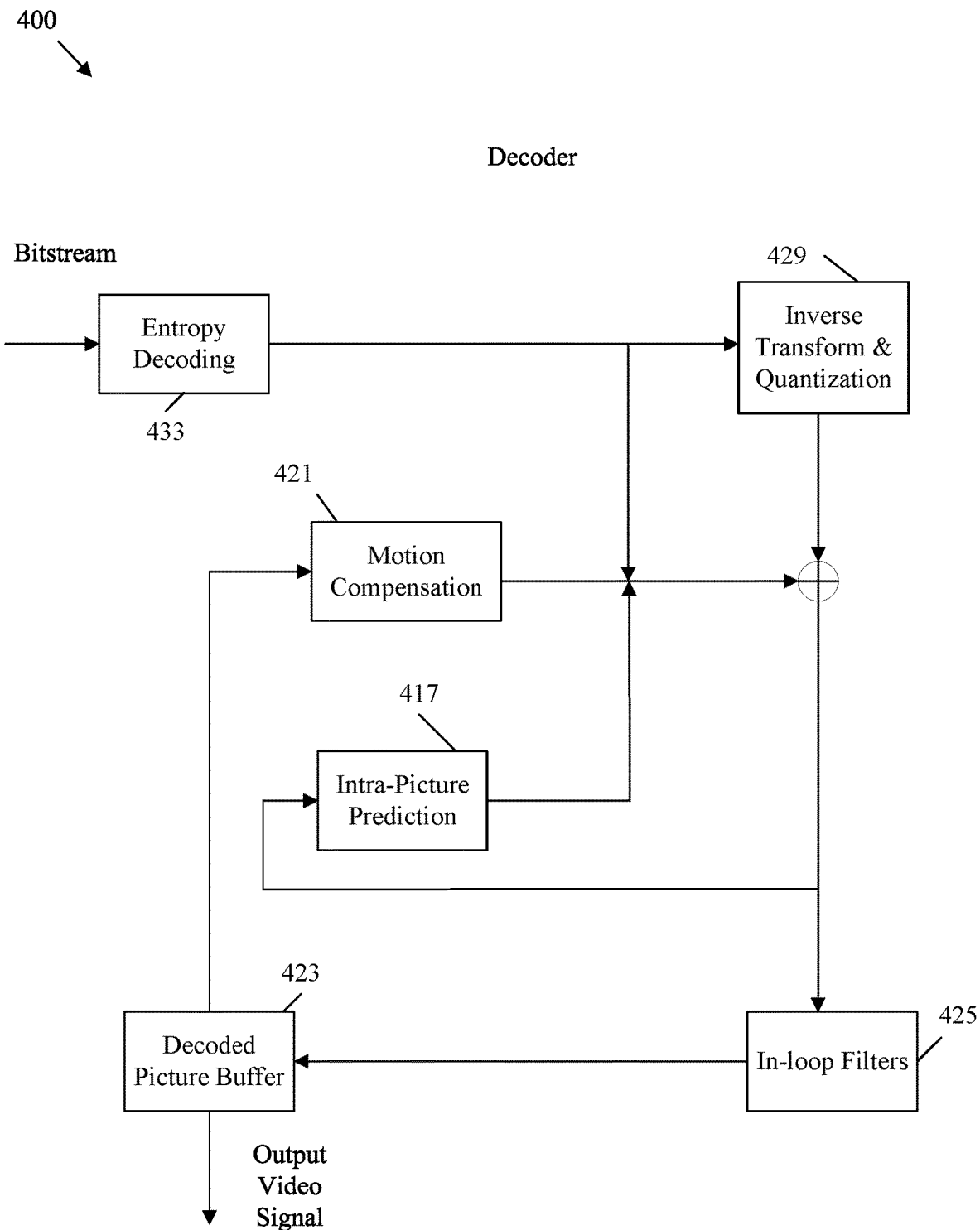
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
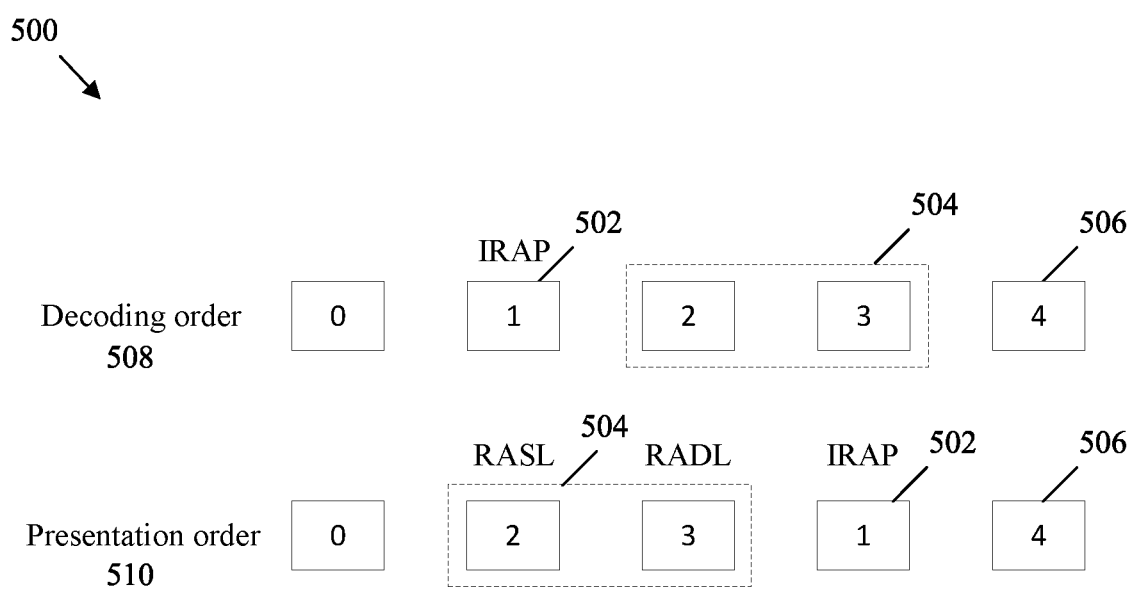
FIG. 5 is a schematic diagram illustrating an example coded video sequence.

FIG. 5 is a schematic diagram illustrating an example CVS 500. For example, CVS 500 may be encoded by an encoder, such as codec system 200 and/or encoder 300, according to method 100. Further, the CVS 500 may be decoded by a decoder, such as codec system 200 and/or decoder 400. The CVS 500 includes pictures coded in a decoding order 508. A decoding order 508 is an order in which pictures are positioned in a bitstream. The pictures of the CVS 500 are then output in a presentation order 510. A presentation order 510 is an order in which pictures should be displayed by a decoder to cause the resulting video to display properly. For example, pictures of the CVS 500 may be generally positioned in presentation order 510. However, certain pictures may be moved into different locations to increase coding efficiency, for example by placing similar pictures in closer proximity to support inter-prediction. Moving such pictures in this manner results in the decoding order 508. In the example shown, the pictures are indexed in decoding order 508 from zero to four. In presentation order 510, the pictures at index two and index three have been moved in front of the picture at index zero.

The CVS 500 includes an IRAP picture 502. An IRAP picture 502 is a picture coded according to intra-prediction that serves as a random access point for CVS 500. Specifically, blocks of IRAP picture 502 are coded by reference to other blocks of IRAP picture 502. Since IRAP picture 502 is coded without reference to other pictures, the IRAP picture 502 can be decoded without first decoding any other pictures. Accordingly, a decoder can begin decoding the CVS 500 at IRAP picture 502. Further, IRAP picture 502 may cause the DPB to be refreshed. For example, pictures presented after an IRAP picture 502 may not rely on pictures prior to IRAP picture 502 (e.g., picture index zero) for inter-prediction. As such, the picture buffer can be refreshed once IRAP picture 502 is decoded. This has the effect of stopping any inter-prediction related coding errors because such errors cannot propagate through the IRAP picture 502. IRAP picture 502 may include various types of pictures. For example, an IRAP picture may be coded as an IDR or a CRA. An IDR is an intra-coded picture that begins a new CVS 500 and refreshes the picture buffer. A CRA is an intra-coded picture that acts as a random access point without beginning a new CVS 500 or refreshing the picture buffer. In this way, leading pictures 504 associated with a CRA may reference pictures prior to the CRA, while leading pictures 504 associated with an IDR may not reference pictures prior to the IDR.

The CVS 500 also includes various non-IRAP pictures. These include leading pictures 504 and trailing pictures 506. A leading picture 504 is a picture positioned after the IRAP picture 502 in decoding order 508, but positioned before the IRAP picture 502 in presentation order 510. Trailing pictures 506 are positioned after the IRAP picture 502 in both decoding order 508 and presentation order 510. Leading pictures 504 and trailing pictures 506 are both coded according to inter-prediction. Trailing pictures 506 are coded in reference to IRAP picture 502 or pictures positioned after IRAP picture 502. Hence, trailing pictures 506 can always be decoded once IRAP picture 502 is decoded. Leading pictures 504 may include random access skipped leading (RASL) and random access decodable leading (RADL) pictures. A RASL picture is coded by reference to pictures prior to TRAP picture 502, but coded in a position after IRAP picture 502. As RASL pictures rely on previous pictures, the RASL picture cannot be decoded when the decoder begins decoding at IRAP picture 502. Accordingly, RASL pictures are skipped and not decoded when IRAP picture 502 is used as a random access point. However, RASL pictures are decoded and displayed when the decoder uses a previous IRAP picture (prior to index zero and not shown) as the random access point. RADL pictures are coded in reference to IRAP picture 502 and/or pictures following IRAP picture 502, but are positioned prior to IRAP picture 502 in presentation order 510. Since RADL pictures do not rely on pictures prior to IRAP picture 502, the RADL pictures can be decoded and displayed when the IRAP picture 502 is the random access point.

The pictures from CVS 500 may each be stored in an access unit. Further, the pictures may be partitioned into slices, and the slices may be included in NAL units. A NAL unit is a storage unit that contains a parameter set or a slice of a picture and a corresponding slice header. The NAL units are assigned types to indicate to the decoder the type of data contained in the NAL unit. For example, slices from an IRAP picture 502 may be contained in an IDR with RADL (IDR_W_RADL) NAL unit, an IDR with no leading pictures (IDR_N_LP) NAL unit, a CRA NAL unit, etc. The IDR_W_RADL NAL unit indicates the IRAP picture 502 is an IDR picture that is associated with a RADL leading picture 504. The IDR_N_LP NAL unit indicates the IRAP picture 502 is an IDR picture that is not associated with any leading pictures 504. The CRA NAL unit indicates the IRAP picture 502 is a CRA picture that may be associated with leading pictures 504. The slices of non-IRAP pictures may also be placed into NAL units. For example, the slices of the trailing pictures 506 may be placed in a trailing picture NAL unit type (TRAIL_NUT), which indicates the trailing pictures 506 are inter-prediction coded pictures. The slices of the leading pictures 504 may be included in a RASL NAL unit type (RASL_NUT) and/or a RADL NAL unit type (RADL_NUT), which may indicate the corresponding pictures are inter-prediction coded leading pictures 504 of the corresponding types. By signaling the slices of the pictures in corresponding NAL units, the decoder can easily determine the appropriate decoding mechanisms to apply to each picture/slice.

Figure 6:
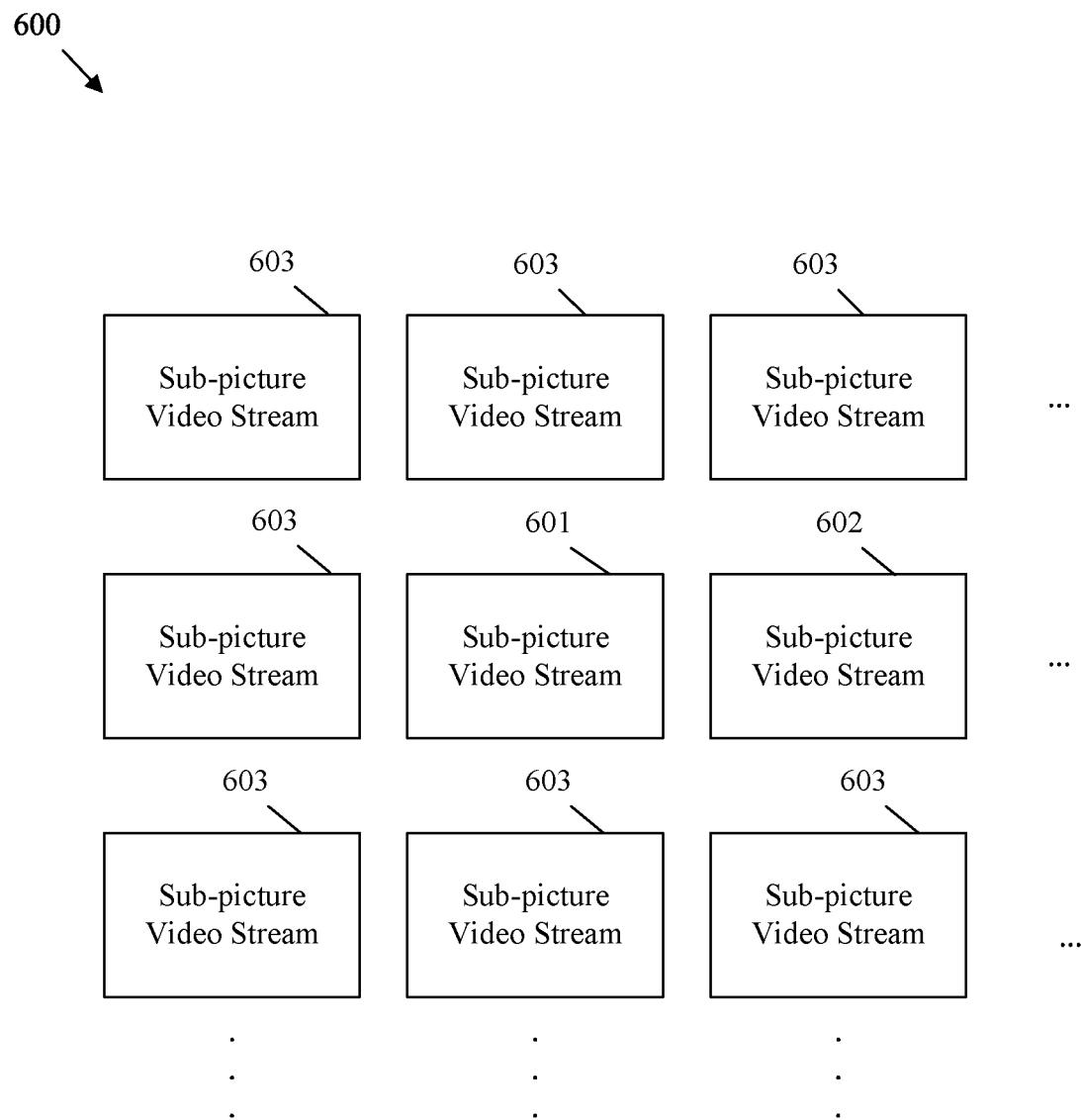
FIG. 6 is a schematic diagram illustrating a plurality of sub-picture video streams split from a virtual reality (VR) picture video stream.

FIG. 6 is a schematic diagram illustrating a plurality of sub-picture video streams 601, 602, and 603 split from a VR picture video stream 600. For example, each of the sub-picture video streams 601-603 and/or the VR picture video stream 600 may be coded in a CVS 500. Accordingly, the sub-picture video streams 601-603 and/or the VR picture video stream 600 may be encoded by an encoder, such as codec system 200 and/or encoder 300, according to method 100. Further, the sub-picture video streams 601-603 and/or the VR picture video stream 600 may be decoded by a decoder, such as codec system 200 and/or decoder 400.

A VR picture video stream 600 includes a plurality of pictures presented over time. Specifically, VR operates by coding a sphere of video content, which can be displayed as if the user is in the center of the sphere. Each picture includes the entire sphere. Meanwhile, only a portion of the picture, known as a viewport, is displayed to the user. For example, the user may employ a head mounted display (HMD) that selects and displays a viewport of the sphere based on the user's head movement. This provides the impression of being physically present in a virtual space as depicted by the video. In order to accomplish this result, each picture of the video sequence includes an entire sphere of video data at a corresponding instant in time. However, only a small portion (e.g., a single viewport) of the picture is displayed to the user. The remainder of the picture is discarded without being rendered. The entire picture is generally transmitted so that a different viewport can be dynamically selected and displayed in response to the users head movement.

In the example shown, the pictures of the VR picture video stream 600 can each be sub-divided into sub-pictures based on available viewports. Accordingly, each picture and corresponding sub-picture includes a temporal position (e.g., picture order) as part of the temporal presentation. Sub-picture video streams 601-603 are created when the sub-division is applied consistently over time. Such consistent sub-division creates sub-picture video streams 601-603 where each stream contains a set of sub-pictures of a predetermined size, shape, and spatial position relative to corresponding pictures in the VR picture video stream 600. Further, the set of sub-pictures in a sub-picture video stream 601-603 varies in temporal position over the presentation time. As such, the sub-pictures of the sub-picture video streams 601-603 can be aligned in the time domain based on temporal position. Then the sub-pictures from the sub-picture video streams 601-603 at each temporal position can be merged in the spatial domain based on predefined spatial position to reconstruct the VR picture video stream 600 for display. Specifically, the sub-picture video streams 601-603 can each be encoded into separate sub-bitstreams. When such sub-bitstreams are merged together, they result in a bitstream that includes the entire set of pictures over time. The resulting bitstream can be transmitted toward the decoder for decoding and display based on the user's currently selected viewport.

One of the issues with VR video is that all of the sub-picture video streams 601-603 may be transmitted to a user at a high quality (e.g., high resolution). This allows the decoder to dynamically select the user's current viewport and display the sub-picture(s) from the corresponding sub-picture video streams 601-603 in real time. However, the user may only view a single viewport, for example from sub-picture video stream 601, while sub-picture video streams 602-603 are discarded. As such transmitting sub-picture video streams 602-603 at a high quality may waste a significant amount of bandwidth. In order to improve coding efficiency, the VR video may be encoded into a plurality of video streams 600 where each video stream 600 is encoded at a different quality/resolution. In this way, the decoder can transmit a request for a current sub-picture video stream 601. In response, the encoder (or an intermediate slicer or other content server) can select the higher quality sub-picture video stream 601 from the higher quality video stream 600 and the lower quality sub-picture video streams 602-603 from the lower quality video stream 600. The encoder can then merge such sub-bitstreams together into a complete encoded bitstream for transmission to the decoder. In this way, the decoder receives a series of pictures where the current viewport is higher quality and the other viewports are lower quality. Further, the highest quality sub-pictures are generally displayed to the user (absent head movement) and the lower quality sub-pictures are generally discarded, which balances functionality with coding efficiency.

In the event that the user turns from viewing the sub-picture video stream 601 to the sub-picture video stream 602, the decoder requests the new current sub-picture video stream 602 be transmitted at the higher quality. The encoder can then alter the merging mechanism accordingly. As noted above, a decoder can only begin decoding a new CVS 500 at an IRAP picture 502. Accordingly, the sub-picture video stream 602 is displayed at the lower quality until an IRAP picture/sub-picture is reached. The IRAP picture can then be decoded at the higher quality to begin the decoding of the higher quality version of the sub-picture video stream 602. This approach significantly increases video compression without negatively impacting the user's viewing experience.

One concern with the abovementioned approach is that the length of time needed to change resolutions is based on the length of time until an IRAP picture is reached in the video stream. This is because the decoder is unable to begin decoding a different version of sub-picture video stream 602 at a non-IRAP picture. One approach to reduce such latency is to include more IRAP pictures. However, this results in an increase in file size. In order to balance functionality with coding efficiency, different viewports/sub-picture video streams 601-603 may include IRAP pictures at different frequencies. For example, viewports/sub-picture video streams 601-603 that are more likely to be viewed may have more TRAP pictures than other viewports/sub-picture video streams 601-603. For example, in a basketball context, the viewports/sub-picture video streams 601-603 related to the baskets and/or center court may include TRAP pictures at a greater frequency than viewports/sub-picture video streams 601-603 that view the stands or the ceiling as such viewports/sub-picture video streams 601-603 are less likely to be viewed by the user.

This approach leads to additional problems. Specifically, the sub-pictures from the sub-picture video streams 601-603 that share a POC are part of a single picture. As noted above, slices from a picture are included in a NAL unit based on picture type. In some video coding systems, all NAL units related to a single picture are constrained to include the same NAL unit type. When different sub-picture video streams 601-603 have IRAP pictures at different frequencies, some of the pictures include both IRAP sub-pictures and non-IRAP sub-pictures. This violates the constraint that each single picture should employ only NAL units of the same type.

The present disclosure addresses this issue by removing the constraint that all NAL units for slices in a picture employ the same NAL unit type. For example, a picture is included in an access unit. By removing this constraint, an access unit may include both TRAP NAL unit types and non-IRAP NAL unit types. Further, a flag can be encoded to indicate when a picture/access unit includes a mixture of IRAP NAL unit types and non-IRAP NAL unit types. In some examples, the flag is a mixed NAL unit types in picture flag (mixed_nalu_types_in_pic_flag). In addition, a constraint may be applied to require that a single mixed picture/access unit may only contain one type of TRAP NAL unit and one type of non-IRAP NAL unit. This prevents unintended NAL unit type mixes from occurring. If such mixes were allowed, the decoder would have to be designed to manage such mixes. This would unnecessarily increase the required hardware complexity without providing additional benefit to the coding process. For example, the mixed picture may include one type of TRAP NAL unit selected from IDR_W_RADL, IDR_N_LP, or CRA_NUT. Further, the mixed picture may include one type of non-IRAP NAL unit selected from TRAIL_NUT, RADL_NUT, and RASL_NUT. Example implementations of this scheme are discussed in more detail below.

Figure 7:
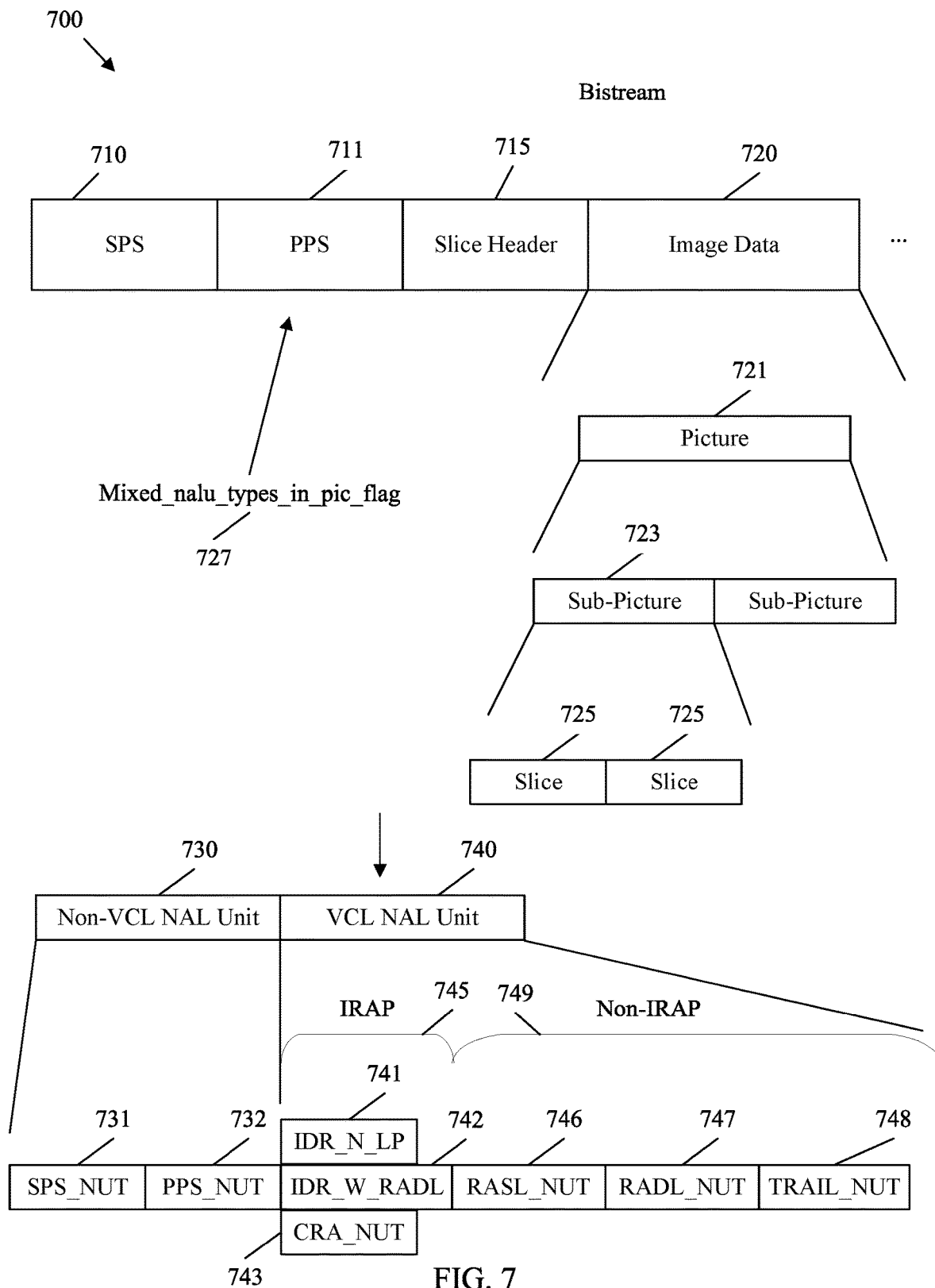
FIG. 7 is a schematic diagram illustrating an example bitstream containing pictures with mixed Network Abstraction Layer (NAL) unit types.

FIG. 7 is a schematic diagram illustrating an example bitstream 700 containing pictures with mixed NAL unit types. For example, the bitstream 700 can be generated by a codec system 200 and/or an encoder 300 for decoding by a codec system 200 and/or a decoder 400 according to method 100. Further, the bitstream 700 may include VR picture video stream 600 merged from multiple sub-picture video streams 601-603 at a plurality of video resolutions where each sub-picture video stream contains a CVS 500 at a different spatial position.

The bitstream 700 includes a sequence parameter set (SPS) 710, a plurality of picture parameter sets (PPSs) 711, a plurality of slice headers 715, and image data 720. An SPS 710 contains sequence data common to all the pictures in the video sequence contained in the bitstream 700. Such data can include picture sizing, bit depth, coding tool parameters, bit rate restrictions, etc. The PPS 711 contains parameters that apply to an entire picture. Hence, each picture in the video sequence may refer to a PPS 711. It should be noted that, while each picture refers to a PPS 711, a single PPS 711 can contain data for multiple pictures in some examples. For example, multiple similar pictures may be coded according to similar parameters. In such a case, a single PPS 711 may contain data for such similar pictures. The PPS 711 can indicate coding tools available for slices in corresponding pictures, quantization parameters, offsets, etc. The slice header 715 contains parameters that are specific to each slice in a picture. Hence, there may be one slice header 715 per slice in the video sequence. The slice header 715 may contain slice type information, picture order counts (POCs), reference picture lists, prediction weights, tile entry points, deblocking parameters, etc. It should be noted that a slice header 715 may also be referred to as a tile group header in some contexts.

The image data 720 contains video data encoded according to inter-prediction and/or intra-prediction as well as corresponding transformed and quantized residual data. For example, a video sequence includes a plurality of pictures 721 coded as image data 720. A picture 721 is a single frame of a video sequence and hence is generally displayed as a single unit when displaying the video sequence. However, sub-pictures 723 may be displayed to implement certain technologies such as virtual reality. The pictures 721 each reference a PPS 711. The pictures 721 may be divided into sub-pictures 723, tiles, and/or slices. A sub-picture 723 is a spatial region of a picture 721 that is applied consistently over a coded video sequence. Accordingly, a sub-picture 723 may be displayed by a HMD in a VR context. Further, a sub-picture 723 with a specified POC may be obtained from a sub-picture video stream 601-603 at a corresponding resolution. A sub-picture 723 may reference the SPS 710. In some systems, the slices 725 are referred to as tile groups containing tiles. The slices 725 and/or tile groups of tiles reference a slice header 715. A slice 725 may be defined as an integer number of complete tiles or an integer number of consecutive complete CTU rows within a tile of a picture 721 that are exclusively contained in a single NAL unit. Hence, the slices 725 are further divided into CTUs and/or CTBs. The CTUs/CTBs are further divided into coding blocks based on coding trees. The coding blocks can then be encoded/decoded according to prediction mechanisms.

The parameter sets and/or slices 725 are coded in NAL units. A NAL unit may be defined as a syntax structure containing an indication of the type of data to follow and bytes containing that data in the form of an RBSP interspersed as necessary with emulation prevention bytes. More specifically, a NAL unit is a storage unit that contains a parameter set or a slice 725 of a picture 721 and a corresponding slice header 715. Specifically, VCL NAL units 740 are NAL units that contain a slice 725 of a picture 721 and a corresponding slice header 715. Further, non-VCL NAL units 730 contain parameter sets, such as the SPS 710 and the PPS 711. Several types of NAL units may be employed. For example, the SPS 710 and the PPS 711 may be included in a SPS NAL unit type (SPS_NUT) 731 and a PPS NAL unit type (PPS_NUT) 732, respectively, which are both non-VCL NAL units 730.

As noted above, IRAP pictures, such as IRAP picture 502, can be contained in IRAP NAL units 745. Non-IRAP pictures, such as leading pictures 504 and trailing pictures 506, can be included in non-IRAP NAL units 749. Specifically, an IRAP NAL unit 745 is any NAL unit that contains a slice 725 taken from an IRAP picture or sub-picture. A non-IRAP NAL unit 749 is any NAL unit that contains a slice 725 taken from any picture that is not an IRAP picture or sub-picture (e.g., leading pictures or trailing pictures). IRAP NAL units 745 and non-IRAP NAL units 749 are both VCL NAL units 740 as they both contain slice data. In an example embodiment, an IRAP NAL unit 745 may include slices 725 from an IDR picture without leading pictures or an IDR associated with RADL pictures in an IDR_N_LP NAL unit 741 or an IDR_w_RADL NAL unit 742, respectively. Further, an IRAP NAL unit 745 may include slices 725 from a CRA picture in a CRA_NUT 743. In an example embodiment, a non-IRAP NAL unit 749 may include slices 725 from a RASL picture, a RADL picture, or a trailing picture, in a RASL_NUT 746, a RADL_NUT 747, or a TRAIL_NUT 748, respectively. In an example embodiment, a complete list of possible NAL units is shown below as sorted by NAL unit type.

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture | VCL |

-continued

| nal_unit_type | Name of nal_unit_type | Content of NAL unit and RBSP syntax structure | NAL unit type class |
|---|---|---|---|
| 8 | IDR_N_LP | slice_layer_rbsp( ) | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP 11 | Reserved IRAP VCL | VCL |
| 12 | RSV_IRAP 12 | NAL unit types | |
| 13 | DCI_NUT | Decoding capability information decoding_capability_ information_rbsp ( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS NUT | Adaptation parameter set adaptation_parameter_ set_rbsp( ) | non-VCL |
| 18 | SUFFIX_APS_ NUT | | |
| 19 | PH_NUT | Picture header picture_header_rbsp( ) | non-VCL |
| 20 | AUD_NUT | AU delimiter access_unit_ delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_N UT | Supplemental enhancement information sei_rbsp( ) | non-VCL |
| 24 | SUFFIX_SEI_N UT | | |
| 25 | FD_NUT | Filler data filler_data_rbsp( ) | non-VCL |
| 26 | RSV_NVCL_26 | Reserved non-VCL | non-VCL |
| 27 | RSV_NVCL_27 | NAL unit types | |
| 28 . . . 31 | UNSPEC_28 . . . UNSPEC 31 | Unspecified non-VCL NAL unit types | non-VCL |

As noted above, a VR video stream may include sub-pictures 723 with IRAP pictures at different frequencies. This allows fewer IRAP pictures to be employed for spatial regions that a user is unlikely to look at and more IRAP pictures to be employed for spatial regions that a user is likely to view often. In this way, the spatial regions that the user is likely to switch back to regularly can be quickly adjusted to a higher resolution. When this approach results in a picture 721 that includes both IRAP NAL units 745 and non-IRAP NAL units 749, the picture 721 is referred to as a mixed picture. This condition can be signaled by a mixed NAL unit types in picture flag (mixed_nalu_types_in_pic_flag) 727. The mixed_nalu_types_in_pic_flag 727 may be set in the PPS 711. Further, the mixed_nalu_types_in_pic_flag 727 may be set equal to one when specifying that each picture 721 referring to the PPS 711 has more than one VCL NAL unit 740 and the VCL NAL units 740 do not have the same value of NAL unit type (nal_unit_type). Further, the mixed_nalu_types_in_pic_flag 727 may be set equal to zero when each picture 721 referring to the PPS 711 has one or more VCL NAL units 740 and the VCL NAL units 740 of each picture 721 referring to the PPS 711 all have the same value of nal_unit_type.

Further, a constraint may be employed such that VCL NAL units 740 of one or more of the sub-pictures 723 of the picture 721 all have a first particular value of NAL unit type and other VCL NAL units 740 in the picture 721 all have a different second particular value of NAL unit type when the mixed_nalu_types_in_pic_flag 727 is set. For example, the constraint may require that a mixed picture 721 contain a single type of IRAP NAL unit 745 and a single type of non-IRAP NAL unit 749. For example, the picture 721 can include one or more IDR_N_LP NAL units 741, one or more IDR_w_RADL NAL units 742, or one or more CRA_NUTs 743, but not any combination of such IRAP NAL units 745. Further, the picture 721 can include one or more RASL_NUTs 746, one or more RADL_NUTs 747, or one or more TRAIL_NUTs 748, but not any combination of such IRAP NAL units 745.

In an example implementation, picture types are employed for defining decoding processes. Such processes include derivation of picture identification, for example by picture order count (POC), marking of reference pictures status in the decoded picture buffer (DPB), output of pictures from the DPB, etc. A picture can be identified by type based on the NAL unit type that contains all of the coded picture or a sub-portion thereof. In some video coding systems, picture types may include instantaneous decoding refresh (IDR) pictures and non-IDR pictures. In other video coding systems, picture types may include trailing pictures, temporal sub-layer access (TSA) pictures, step-wise temporal sub-layer access (STSA) pictures, random access decodable leading (RADL) pictures, random access skipped leading (RASL) pictures, broken-link access (BLA) pictures, instantaneous random access pictures, and clean random access pictures. Such picture types may be further differentiated based on whether the picture is a sub-layer referenced picture or sub-layer non-referenced picture. A BLA picture may be further differentiated as BLA with leading picture, BLA with RADL picture, and BLA without leading picture. An IDR picture may be further differentiated as an IDR with RADL picture and an IDR without leading picture.

Such picture types may be employed to implement various video related functions. For example, IDR, BLA, and/or CRA pictures may be employed to implement an IRAP picture. An IRAP picture may provide the following functionalities/benefits. The presence of an IRAP picture may indicate that a decoding process can be initiated from that picture. This functionality allows for the implementation of a random access feature in which a decoding process starts at a designated position in a bitstream as long as an IRAP picture is present at that position. Such position is not necessary at the beginning of a bitstream. The presence of an IRAP picture also refreshes a decoding process such that coded pictures starting at the IRAP picture, excluding RASL pictures, are coded without any reference to pictures positioned prior to the IRAP picture. Accordingly, an IRAP picture positioned in a bitstream stops the propagation of decoding errors. Hence, decoding errors of coded pictures positioned prior to the IRAP picture cannot propagate through the IRAP picture and into the pictures that follow the IRAP picture in decoding order.

IRAP pictures provide various functionalities, but create a penalty to compression efficiency. Accordingly, the presence of an IRAP picture may cause a surge in bit-rate. This penalty to the compression efficiency has various causes. For example, an IRAP picture is an intra-predicted picture that is represented by significantly more bits than inter-predicted pictures used as non-IRAP pictures. Further, the presence of an TRAP picture breaks temporal prediction used in inter-prediction. Specifically, the TRAP picture refreshes the decoding process by removing previous reference pictures from the DPB. Removing the previous reference pictures reduces the availability of reference pictures for use in coding of pictures that follow the IRAP picture in decoding order, and hence reduces the efficiency of this process.

IDR pictures may employ different signaling and derivation processes than other IRAP picture types. For example, IDR related signaling and derivation processes may set the most significant bit (MSB) part of the POC to zero instead of deriving the MSB from a previous key picture. Further, a slice header of an IDR picture may not contain information used to assist in reference picture management. Meanwhile, other picture types, such as CRA, trailing, TSA, etc., may contain reference picture information such as a reference picture set (RPS) or a reference picture list, which can be employed to implement the reference pictures marking process. The reference pictures marking process is the process of determining the status of reference pictures in the DPB as either used for reference or unused for reference. For IDR pictures, such information may not be signaled because the presence of IDR indicates that the decoding process shall simply mark all reference pictures in the DPB as unused for reference.

In addition to picture types, picture identification by POC is also employed for multiple purposes, such as for use managing reference pictures in inter-prediction, for output of pictures from the DPB, for scaling of motion vectors, for weighted prediction, etc. For example, in some video coding systems pictures in the DPB can be marked as used for short-term reference, used for long-term reference, or unused for reference. Once a picture has been marked unused for reference the picture can no longer be used for prediction. When such a picture is no longer needed for output the picture can be removed from the DPB. In other video coding systems, reference pictures may be marked as short-term and long-term. A reference picture may be marked as unused for reference when the picture is no longer needed for prediction reference. The conversion among these statuses may be controlled by the decoded reference picture marking process. An implicit sliding window process and/or an explicit memory management control operation (MMCO) process may be employed as decoded reference picture marking mechanisms. The sliding window process marks a short-term reference picture as unused for reference when the number of reference frames is equal to a specified maximum number denoted as max_num_ref_frames in the SPS. The short-term reference pictures may be stored in a first-in first-out manner so that the most recently decoded short-term pictures are retained in the DPB. The explicit MMCO process may include multiple MMCO commands. An MMCO command may mark one or more short-term or long-term reference pictures as unused for reference, mark all the pictures as unused for reference, or mark the current reference picture or an existing short-term reference picture as long-term and assign a long-term picture index to that long-term reference picture.

In some video coding systems the reference picture marking operations as well as the processes for output and removal of pictures from the DPB are performed after a picture has been decoded. Other video coding systems employ a RPS for reference picture management. The most fundamental difference between the RPS mechanism and the MMCO/sliding window process is that for each particular slice the RPS provides a complete set of the reference pictures that are used by the current picture or any subsequent picture. Thus, a complete set of all pictures that should be kept in the DPB for use by the current or future picture is signaled in the RPS. This is different from the MMCO/sliding window scheme where only relative changes to the DPB are signaled. With the RPS mechanism, no information from earlier pictures in decoding order is needed to maintain the correct status of reference pictures in the DPB. The order of picture decoding and DPB operations are altered in some video coding systems in order to exploit the advantages of RPS and improve error resilience. In some video coding systems picture marking and buffer operations including both output and removal of decoded pictures from the DPB may be applied after a current picture has been decoded. In other video coding systems, the RPS is first decoded from a slice header of the current picture, and then picture marking and buffer operations may be applied before decoding the current picture.

In VVC, the reference picture management approach may be summarized as follows. Two reference picture lists, denoted list 0 and list 1, are directly signaled and derived. They are not based on RPS or the sliding window plus MMCO process as discussed above. Reference picture marking is directly based on reference picture lists 0 and 1 utilizing both active and inactive entries in the reference picture lists, while only active entries may be used as reference indices in inter-prediction of CTUs. Information for derivation of the two reference picture lists is signaled by syntax elements and syntax structures in the SPS, the PPS, and the slice header. Predefined RPL structures are signaled in the SPS for use by referencing in the slice header. The two reference picture lists are generated for all types of slices including bidirectional inter-prediction (B) slices, unidirectional inter-prediction (P) slices, and intra-prediction (I) slices. The two reference picture lists may be constructed without using a reference picture list initialization process or a reference picture list modification process. Long-term reference pictures (LTRPs) are identified by POC LSBs. Delta POC MSB cycles may be signaled for LTRPs as determined by a picture by picture basis.

In order to code a video image, the image is first partitioned, and the partitions are coded into a bitstream. Various picture partitioning schemes are available. For example, an image can be partitioned into regular slices, dependent slices, tiles, and/or according to Wavefront Parallel Processing (WPP). For simplicity, HEVC restricts encoders so that only regular slices, dependent slices, tiles, WPP, and combinations thereof can be used when partitioning a slice into groups of CTBs for video coding. Such partitioning can be applied to support Maximum Transfer Unit (MTU) size matching, parallel processing, and reduced end-to-end delay. MTU denotes the maximum amount of data that can be transmitted in a single packet. If a packet payload is in excess of the MTU, that payload is split into two packets through a process called fragmentation.

A regular slice, also referred to simply as a slice, is a partitioned portion of an image that can be reconstructed independently from other regular slices within the same picture, notwithstanding some interdependencies due to loop filtering operations. Each regular slice is encapsulated in its own Network Abstraction Layer (NAL) unit for transmission. Further, in-picture prediction (intra sample prediction, motion information prediction, coding mode prediction) and entropy coding dependency across slice boundaries may be disabled to support independent reconstruction. Such independent reconstruction supports parallelization. For example, regular slice based parallelization employs minimal inter-processor or inter-core communication. However, as each regular slice is independent, each slice is associated with a separate slice header. The use of regular slices can incur a substantial coding overhead due to the bit cost of the slice header for each slice and due to the lack of prediction across the slice boundaries. Further, regular slices may be employed to support matching for MTU size requirements. Specifically, as a regular slice is encapsulated in a separate NAL unit and can be independently coded, each regular slice should be smaller than the MTU in MTU schemes to avoid breaking the slice into multiple packets. As such, the goal of parallelization and the goal of MTU size matching may place contradicting demands to a slice layout in a picture.

Dependent slices are similar to regular slices, but have shortened slice headers and allow partitioning of the image treeblock boundaries without breaking in-picture prediction. Accordingly, dependent slices allow a regular slice to be fragmented into multiple NAL units, which provides reduced end-to-end delay by allowing a part of a regular slice to be sent out before the encoding of the entire regular slice is complete.

Pictures may be divided into tile groups/slices and tiles. A tile is a sequence of CTUs that cover a rectangular region of a picture. A tile group/slice contains a number of tiles of a picture. Raster-scan tile group mode and rectangular tile group mode may be employed to create tiles. In the raster-scan tile group mode, a tile group contains a sequence of tiles in tile raster scan of a picture. In the rectangular tile group mode, a tile group contains a number of tiles of a picture that collectively form a rectangular region of the picture. The tiles within a rectangular tile group are in the order of tile raster scan of the tile group. For example, a tile may be a partitioned portion of an image created by horizontal and vertical boundaries that create columns and rows of tiles. Tiles may be coded in raster scan order (right to left and top to bottom). The scan order of CTBs is local within a tile. Accordingly, CTBs in a first tile are coded in raster scan order, before proceeding to the CTBs in the next tile. Similar to regular slices, tiles break in-picture prediction dependencies as well as entropy decoding dependencies. However, tiles may not be included into individual NAL units, and hence tiles may not be used for MTU size matching. Each tile can be processed by one processor/core, and the inter-processor/inter-core communication employed for in-picture prediction between processing units decoding neighboring tiles may be limited to conveying a shared slice header (when adjacent tiles are in the same slice), and performing loop filtering related sharing of reconstructed samples and metadata. When more than one tile is included in a slice, the entry point byte offset for each tile other than the first entry point offset in the slice may be signaled in the slice header. For each slice and tile, at least one of the following conditions should be fulfilled: 1) all coded treeblocks in a slice belong to the same tile; and 2) all coded treeblocks in a tile belong to the same slice.

In WPP, the image is partitioned into single rows of CTBs. Entropy decoding and prediction mechanisms may use data from CTBs in other rows. Parallel processing is made possible through parallel decoding of CTB rows. For example, a current row may be decoded in parallel with a preceding row. However, decoding of the current row is delayed from the decoding process of the preceding rows by two CTBs. This delay ensures that data related to the CTB above and the CTB above and to the right of the current CTB in the current row is available before the current CTB is coded. This approach appears as a wavefront when represented graphically. This staggered start allows for parallelization with up to as many processors/cores as the image contains CTB rows. Because in-picture prediction between neighboring treeblock rows within a picture is permitted, the inter-processor/inter-core communication to enable in-picture prediction can be substantial. The WPP partitioning does consider NAL unit sizes. Hence, WPP does not support MTU size matching. However, regular slices can be used in conjunction with WPP, with certain coding overhead, to implement MTU size matching as desired. Finally, a wavefront segment may contain exactly one CTB row. Further, when employing WPP and when a slice starts within a CTB row the slice should end in the same CTB row.

Tiles may also include motion constrained tile sets. A motion constrained tile set (MCTS) is a tile set designed such that associated motion vectors are restricted to point to full-sample locations inside the MCTS and to fractional-sample locations that require only full-sample locations inside the MCTS for interpolation. Further, the usage of motion vector candidates for temporal motion vector prediction derived from blocks outside the MCTS is disallowed. This way, each MCTS may be independently decoded without the existence of tiles not included in the MCTS. Temporal MCTSs supplemental enhancement information (SEI) messages may be used to indicate the existence of MCTSs in the bitstream and signal the MCTSs. The MCTSs SEI message provides supplemental information that can be used in the MCTS sub-bitstream extraction (specified as part of the semantics of the SEI message) to generate a conforming bitstream for an MCTS set. The information includes a number of extraction information sets, each defining a number of MCTS sets and containing raw bytes sequence payload (RBSP) bytes of the replacement video parameter set (VPSs), sequence parameter sets (SPSs), and picture parameter sets (PPSs) to be used during the MCTS sub-bitstream extraction process. When extracting a sub-bitstream according to the MCTS sub-bitstream extraction process, parameter sets (VPSs, SPSs, and PPSs) may be rewritten or replaced, and slice headers may updated because one or all of the slice address related syntax elements (including first_slice_segment_in_pic_flag and slice_segment_address) may employ different values in the extracted sub-bitstream.

VR applications, also referred to as 360 degree video applications, may display only part of a complete sphere and consequently only a sub-set of an entire picture. A viewport-dependent 360 delivery over dynamic adaptive streaming over hypertext transfer protocol (DASH) mechanism may be employed to reduce bitrate and support delivery of 360 degree video via streaming mechanisms. This mechanism divides the sphere/projected picture into multiple MCTSs, for example by employing cubemap projection (CMP). Two or more bitstreams may be encoded with different spatial resolutions or qualities. When delivering data to the decoder, the MCTS(s) from a higher resolution/quality bitstream are transmitted for the viewport to be displayed (e.g., the front viewport). The MCTSs from lower resolution/quality bitstreams are transmitted for the other viewports. These MCTSs are packed in a certain way and then sent to the receiver to be decoded. The expectation is that the viewport seen by the user is represented by a high resolution/quality MCTS to create a positive viewing experience. When the user's head turns to see another viewport (e.g., the left or right viewport), the displayed content comes from the lower resolution/quality viewport for a short period while the system is fetching the high resolution/quality MCTSs for the new viewport. When the user's head turns to see another viewport, there is a delay between the time of the user head turn and the time when a higher resolution/quality representation of the viewport is seen. This delay depends on how fast the system can fetch the higher resolution/quality MCTSs for that viewport, which in turn depends on the IRAP period. The IRAP period is the interval between the occurrences of two IRAPs. This delay relates to the IRAP period because the MCTSs of the new viewport can only be decodable starting from an IRAP picture.

For example, if the IRAP period is coded every one second then the following applies. The best case scenario for the delay is the same as the network round-trip delay if the user's head turns to see the new viewport just before the system starts fetching the new segment/IRAP period. In this scenario, the system would be able request the higher resolution/quality MCTSs for the new viewport right away, and thus the only delay is the network round-trip delay, which is the delay of the fetching request plus the transmission time of the requested MCTSs, assuming that the minimum buffering delay can be set to about zero and the sensor delay is small and negligible. The network round-trip delay can be around two hundred milliseconds, for example. The worst case scenario for the delay is the IRAP period+ network round-trip delay if the user's head turns to see the new viewport just after the system already made a request for the next segment. The bitstreams can be encoded with more frequent IRAP pictures so that the IRAP period is shorter to improve the worst case scenario above as this reduces the overall delay. However, this approach increases the bandwidth requirements as the compression efficiency is lowered.

In an example implementation, sub-pictures of the same coded picture are allowed to contain different nal_unit_type values. This mechanism is described as follows. Pictures may be divided into sub-pictures. A sub-picture is a rectangular set of tile groups/slices that starts with a tile group that has tile_group_address equal to zero. Each sub-picture may refer to a corresponding PPS and may hence have a separate tile partitioning. The existence of sub-pictures may be indicated in the PPS. Each sub-picture is treated like a picture in the decoding process. In-loop filtering across sub-picture boundaries may always be disabled. The sub-picture width and height may be specified in units of luma CTU sizes. The location of a sub-picture in a picture may not be signaled, but may be derived using the following rule. The sub-picture takes the next such unoccupied location in CTU raster scan order within a picture that is large enough to contain the sub-picture within the picture boundaries. The reference pictures for decoding each sub-picture are generated by extracting the area collocated with the current sub-picture from the reference pictures in the decoded picture buffer. The extracted area is a decoded sub-picture, and hence inter-prediction takes place between sub-pictures of the same size and the same location within the picture. In such a case, allowing different nal_unit_type values within a coded picture enables sub-pictures originating from a random-access picture and sub-pictures originating from a non-random-access picture to be merged into the same coded picture without substantial difficulty (e.g., without VCL-level modifications). Such a benefit also holds for MCTS-based coding.

Allowing different nal_unit_type values within a coded picture may be beneficial in other scenarios. For example, a user may watch some areas of a 360 degree video content more often than other areas. To create a better trade-off between coding efficiency and the average comparable quality viewport switching latency in MCTS/sub-picture-based viewport-dependent 360 degree video delivery more frequent IRAP pictures can be coded for more-commonly watched areas than the other areas. The comparable quality viewport switching latency is the latency experienced by the user when switching from a first viewport to a second viewport until the presentation quality of the second viewport reaches a comparable presentation quality as the first viewport.

Another implementation employs the following solutions for support of mixed NAL unit types within a picture including POC derivation and reference picture management. A flag (sps_mixed_tile_groups_in_pic_flag) is present in a parameter set that is referred to directly or indirectly by tile groups to specify whether or not there may be pictures with mixed TRAP and non-IRAP sub-pictures. For a NAL unit containing an IDR tile group, a flag (poc_msb_reset_flag) is present in a corresponding tile group header to specify whether or not POC MSB is reset in the POC derivation for the picture. A variable called PicRefreshFlag is defined and is associated with a picture. This flag specifies whether POC derivation and the DPB state should be refreshed when decoding the picture. The value of PicRefreshFlag is derived as follows. If the current tile group is included in the first access unit in the bitstream, PicRefreshFlag is set equal to one. Otherwise if the current tile group is an IDR tile group, PicRefreshFlag is set equal to sps_mixed_tile_groups_in_pic_flag ? poc_msb_reset_flag: 1. Otherwise if the current tile group is a CRA tile group, the following applies. If the current access unit is the first access unit of a coded sequence, PicRefreshFlag is set equal to one. The current access unit is the first access unit of a coded sequence when the access unit immediately follows an end of sequence NAL unit or the associated variable HandleCraAsFirstPicInCvsFlag is set equal to one. Otherwise, PicRefreshFlag is set equal to zero (e.g., the current tile group does not belong to the first access unit in the bitstream and is not an TRAP tile group).

When PicRefreshFlag is equal to one, the value of POC MSB (PicOrderCntMsb) is reset to be equal to zero during derivation of POC for the picture. Information employed for reference picture management such as reference picture set (RPS) or reference picture list (RPL) is signaled in the tile group/slice header regardless of a corresponding NAL unit type. Reference picture lists are constructed at the beginning of the decoding of each tile group regardless of NAL unit type. Reference picture lists may include RefPicList[0] and RefPicList[1] for an RPL approach, RefPicList0[ ] and RefPicList1[ ] for an RPS approach, or similar lists containing reference pictures for inter-prediction operations for a picture. When PicRefreshFlag is equal to one, during the reference picture marking process all reference pictures in the DPB are marked as unused for reference.

Such implementations are associated with certain problems. For example, when mixing of nal_unit_type values within a picture is not allowed and when the derivation of whether a picture is an TRAP picture and the derivation of the variable NoRaslOutputFlag are described at picture level, the decoder can perform these derivations after receiving the first VCL NAL unit of any picture. However, due to support of mixed NAL unit types within a picture, the decoder would have to wait for the arrival of other VCL NAL units of a picture prior to performing the above derivations. In the worst case, the decoder would have to wait for the arrival of the last VCL NAL unit of a picture. Further, such systems may signal a flag in the tile group headers of IDR NAL units to specify whether or not POC MSB is reset in the POC derivation for the picture. This mechanism has the following issues. The case of mixed CRA NAL unit types and non-IRAP NAL unit types would not be supported by this mechanism. Further, signaling of this information in the tile group/slice header of the VCL NAL unit would require the value to be changed during bitstream extraction or merging when a change to the status of whether the TRAP (IDR or CRA) NAL units are mixed with non-IRAP NAL units in a picture. Such rewriting of slice headers would occur whenever a user requests the video, and hence requires significant hardware resources. Further, some other mixes of different NAL unit types within a picture other than the mix of a particular IRAP NAL unit type and a particular non-IRAP NAL unit type are allowed. Such flexibility does not provide support for practical use cases while they complicate the design of the codec, which unnecessarily increases the complexity of the decoder and hence increases associated implementation costs.

In general, this disclosure describes techniques for support of sub-picture or MCTS based random access in video coding. More specifically, this disclosure describes improved designs for support of mixed NAL unit types within a picture, which is employed for supporting sub-picture or MCTS based random access. The description of the techniques is based on VVC standard, but also applies to other video/media codec specifications.

In order to solve the above problems, the following example implementations are disclosed. Such implementations can be applied individually or in combination. In one example, each picture is associated with an indication of whether the picture contains mixed nal_unit_type values. This indication is signaled in the PPS. This indication supports determination of whether to reset the POC MSB and/or to reset the DPB by marking all reference pictures as unused for reference. When the indication is signaled in the PPS, a change of the value in the PPS may be conducted during merging or separate extraction. However this is acceptable as PPSs are rewritten and replaced by other mechanisms during such bitstream extraction or merging.

Alternatively, this indication may be signaled in the tile group header but required to be the same for all tile groups of a picture. However, in this case, the value may need to be changed during sub-bitstream extraction of MCTSs/sub-picture sequences. Alternatively, this indication may be signaled in the NAL unit header but required to be the same for all tile groups of a picture. However, in this case, the value may need to be changed during sub-bitstream extraction of MCTSs/sub-picture sequences. Alternatively, this indication may be signaled by defining such additional VCL NAL unit types that, when used for a picture, all VCL NAL units of the picture shall have the same NAL unit type value. However, in this case, the NAL unit type value of the VCL NAL units may need to be changed during sub-bitstream extraction of MCTSs/sub-picture sequences. Alternatively, this indication may be signaled by defining such additional TRAP VCL NAL unit types that, when used for a picture, all VCL NAL units of the picture shall have the same NAL unit type value. However, in this case, the NAL unit type value of the VCL NAL units may need to be changed during sub-bitstream extraction of MCTSs/sub-picture sequences. Alternatively, each picture that has at least one VCL NAL unit with any of the TRAP NAL unit types may be associated with an indication of whether the picture contains mixed NAL unit type values.

Further, a constraint may be applied such that mixing of nal_unit_type values within a picture is allowed in a limited fashion by only allowing mixed TRAP and non-IRAP NAL unit types. For any particular picture, either all VCL NAL units have the same NAL unit type or some VCL NAL units have a particular IRAP NAL unit type and the rest have a particular non-IRAP VCL NAL unit type. In other words, VCL NAL units of any particular picture cannot have more than one IRAP NAL unit type and cannot have more than one non-IRAP NAL unit type. A picture may be considered as an IRAP picture only if the picture does not contain mixed nal_unit_type values and the VCL NAL units have an IRAP NAL unit type. For any IRAP NAL unit (including IDR) that does not belong to an IRAP picture, the POC MSB may not be reset. For any IRAP NAL unit (including IDR) that does not belong to an TRAP picture, the DPB is not reset, and hence marking of all reference pictures as unused for reference is not performed. The TemporalId may be set equal to zero for a picture if at least one VCL NAL unit of the picture is an IRAP NAL unit.

The following is a specific implementation of one or more of the aspects described above. An IRAP picture may be defined as a coded picture for which the value of mixed_nalu_types_in_pic_flag is equal to zero and each VCL NAL unit has a nal_unit_type in the range of IDR_W_RADL to RSV_IRAP_VCL13, inclusive. Example PPS syntax and semantics are as follows.

| pic_parameter_set_rbsp( ) { | Descriptor |
|---|---|
| pps_pic_parameter_set_id | ue(v) |
| pps_seq_parameter_set_id | ue(v) |
| mixed_nalu_types_in_pic_flag | ue(v) |
| single_tile_in_pic_flag | u(1) |
| ... | |

The mixed_nalu_types_in_pic_flag is set equal to zero to specify that each picture referring to the PPS has multiple VCL NAL units and these NAL units don't have the same value of nal_unit_type. The mixed_nalu_types_in_pic_flag is set equal to zero to specify that the VCL NAL units of each picture referring to the PPS have the same value of nal_unit_type.

Example tile group/slice header syntax is as follows.

| tile_group_header( ) { | Descriptor |
|---|---|
| tile_group_pic_parameter_set_id | ue(v) |
| if( rect_tile_group_flag \|\| NumTilesInPic >1 ) | |
|   tile_group_address | u(v) |
| if( !rect_tile_group_flag && !single_tile_per_tile_group_flag ) | |
|   num_tiles_in_tile_group_minus1 | ue(v) |
| tile_group_type | ue(v) |
| tile_group_pic_order_cnt_lsb | u(v) |
| for( i = 0; i < 2; i++ ) { | |
|   if( num_ref_pic_lists_in_sps[ i ] > 0 && | |
|     (i = = 0 \|\| (i = = 1 && rpl1_idx_ | |
|     present_flag ) ) ) | |
|     ref_pic_list_sps_flag[ i ] | u(1) |
|   if( ref_pic_list_sps_flag[ i ] ) { | |
|     if( num_ref_pic_lists_in_sps[ i ] > 1 && | |
|       ( i = = 0 \|\| ( i = = 1 && rpl1_idx_ | |
|       present_flag ) ) ) | |
|       ref_pic_list_idx[ i ] | u(v) |
|   } else | |
|     ref_pic_list_struct( i, num_ref_pic_lists_in_sps[ i ] ) | |
|   for( j = 0; j < NumLtrpEntries[ i ][ RplsIdx[ i ] ]; j++ ) { | |
|     delta_poc_msb_present_flag[ i ][ j ] | u(1) |
|     if( delta_poc_msb_present_flag[ i ][ j ] ) | |
|       delta_poc_msb_cycle_lt[ i ][ j ] | ue(v) |
|   } | |
| } | |
| if( tile_group_type = = P \|\| tile_group_type = = B ) { | |
|   num_ref_idx_active_override_flag | u(1) |
|   if( num_ref_idx_active_override_flag ) | |
|     for( i = 0; i < ( tile_group_type = = B ? 2: 1 ); i++ ) | |
|       if( num_ref_entries[ i ][ RplsIdx[ i ] ] > 1 ) | |
|         num_ref_idx_active_minus1[ i ] | ue(v) |
| } | |
| ... | |

Example NAL unit header semantics are as follows. For VCL NAL units of any particular picture, either of the following two conditions shall be satisfied. All the VCL NAL units have the same value of nal_unit_type. Some of the VCL NAL units have a particular IRAP NAL unit type value (i.e., a value of nal_unit_type in the range of IDR_W_RADL to RSV_IRAP_VCL13, inclusive), while all the other VCL NAL units have a particular non-IRAP VCL NAL unit type (i.e., a value of nal_unit_type in the range of TRAIL_NUT to RSV_VCL_7, inclusive, or in the range of RSV_VCL14 to RSV_VCL15, inclusive). The nuh_temporal_id_plus1 minus 1 specifies a temporal identifier for the NAL unit. The value of nuh_temporal_id_plus1 shall not be equal to zero.

The variable TemporalId is derived as follows:

$$\text{TemporalId} = \text{nuh\_temporal\_id\_plus1} - 1 \quad (7\text{-}1)$$

When nal_unit_type is in the range of IDR_W_RADL to RSV_IRAP_VCL13, inclusive, for a VCL NAL unit of a picture, regardless of the nal_unit_type value of other VCL NAL units of the picture, TemporalId shall be equal to zero for all VCL NAL units of the picture. The value of TemporalId shall be the same for all VCL NAL units of an access unit. The value of TemporalId of a coded picture or an access unit is the value of the TemporalId of the VCL NAL units of the coded picture or the access unit.

An example decoding process for a coded picture is as follows. The decoding process operates as follows for the current picture CurrPic. The decoding of NAL units is specified herein. The following decoding processes use syntax elements in the tile group header layer and above. Variables and functions relating to picture order count are derived as specified herein. This is invoked only for the first tile group/slice of a picture. At the beginning of the decoding process for each tile group/slice, the decoding process for reference picture lists construction is invoked for derivation of reference picture list 0 (RefPicList[0]) and reference picture list 1 (RefPicList[1]). If the current picture is an IDR picture, then the decoding process for reference picture lists construction may be invoked for bitstream conformance checking purpose, but may not be necessary for decoding of the current picture or pictures following the current picture in decoding order.

A decoding process for reference picture lists construction is as follows. This process is invoked at the beginning of the decoding process for each tile group. Reference pictures are addressed through reference indices. A reference index is an index into a reference picture list. When decoding an I tile group, no reference picture list is used in decoding of the tile group data. When decoding a P tile gorup, only reference picture list zero (RefPicList[0]) is used in decoding of the tile group data. When decoding a B tile group, both reference picture list zero and reference picture list one (RefPicList[1]) are used in decoding of the tile group data. At the beginning of the decoding process for each tile group, the reference picture lists RefPicList[0] and RefPicList[1] are derived. The reference picture lists are used in marking of reference pictures or in decoding of the tile group data. For any tile group of an IDR pictue or an I tile group of a non-IDR picture, RefPicList[0] and RefPicList[1] may be derived for bitstream conformance checking purpose, but their derivation is not necessary for decoding of the current picture or pictures following the current picture in decoding order. For a P tile group, RefPicList[1] may be derived for bitstream conformance checking purpose, but derivation is not necessary for decoding of the current picture or pictures following the current picture in decoding order.

Figure 8:
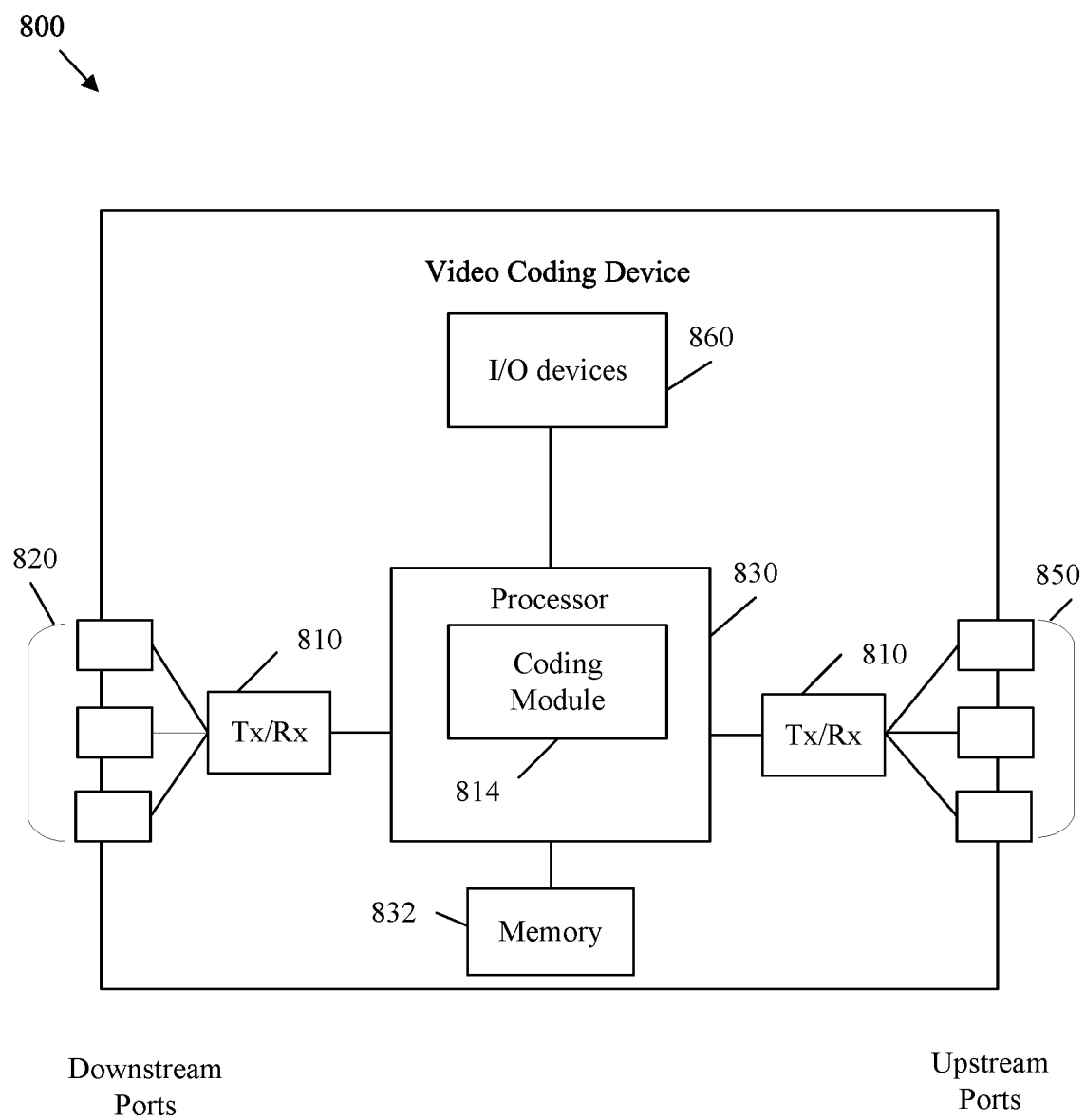
FIG. 8 is a schematic diagram of an example video coding device.

FIG. 8 is a schematic diagram of an example video coding device 800. The video coding device 800 is suitable for implementing the disclosed examples/embodiments as described herein. The video coding device 800 comprises downstream ports 820, upstream ports 850, and/or transceiver units (Tx/Rx) 810, including transmitters and/or receivers for communicating data upstream and/or downstream over a network. The video coding device 800 also includes a processor 830 including a logic unit and/or central processing unit (CPU) to process the data and a memory 832 for storing the data. The video coding device 800 may also comprise electrical, optical-to-electrical (OE) components, electrical-to-optical (EO) components, and/or wireless communication components coupled to the upstream ports 850 and/or downstream ports 820 for communication of data via electrical, optical, or wireless communication networks. The video coding device 800 may also include input and/or output (I/O) devices 860 for communicating data to and from a user. The I/O devices 860 may include output devices such as a display for displaying video data, speakers for outputting audio data, etc. The I/O devices 860 may also include input devices, such as a keyboard, mouse, trackball, etc., and/or corresponding interfaces for interacting with such output devices.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the downstream ports 820, Tx/Rx 810, upstream ports 850, and memory 832. The processor 830 comprises a coding module 814. The coding module 814 implements the disclosed embodiments described herein, such as methods 100, 900, and 1000, which may employ a CVS 500, a VR picture video stream 600, and/or a bitstream 700. The coding module 814 may also implement any other method/mechanism described herein. Further, the coding module 814 may implement a codec system 200, an encoder 300, and/or a decoder 400. For example, the coding module 814 can set a flag in a PPS to indicate when a picture contains both IRAP and non-IRAP NAL units and restrict such pictures to contain only a single type of IRAP NAL unit and a single type of non-TRAP NAL unit. Hence, coding module 814 causes the video coding device 800 to provide additional functionality and/or coding efficiency when coding video data. As such, the coding module 814 improves the functionality of the video coding device 800 as well as addresses problems that are specific to the video coding arts. Further, the coding module 814 effects a transformation of the video coding device 800 to a different state. Alternatively, the coding module 814 can be implemented as instructions stored in the memory 832 and executed by the processor 830 (e.g., as a computer program product stored on a non-transitory medium).

The memory 832 comprises one or more memory types such as disks, tape drives, solid-state drives, read only memory (ROM), random access memory (RAM), flash memory, ternary content-addressable memory (TCAM), static random-access memory (SRAM), etc. The memory 832 may be used as an over-flow data storage device, to store programs when such programs are selected for execution, and to store instructions and data that are read during program execution.

Figure 9:
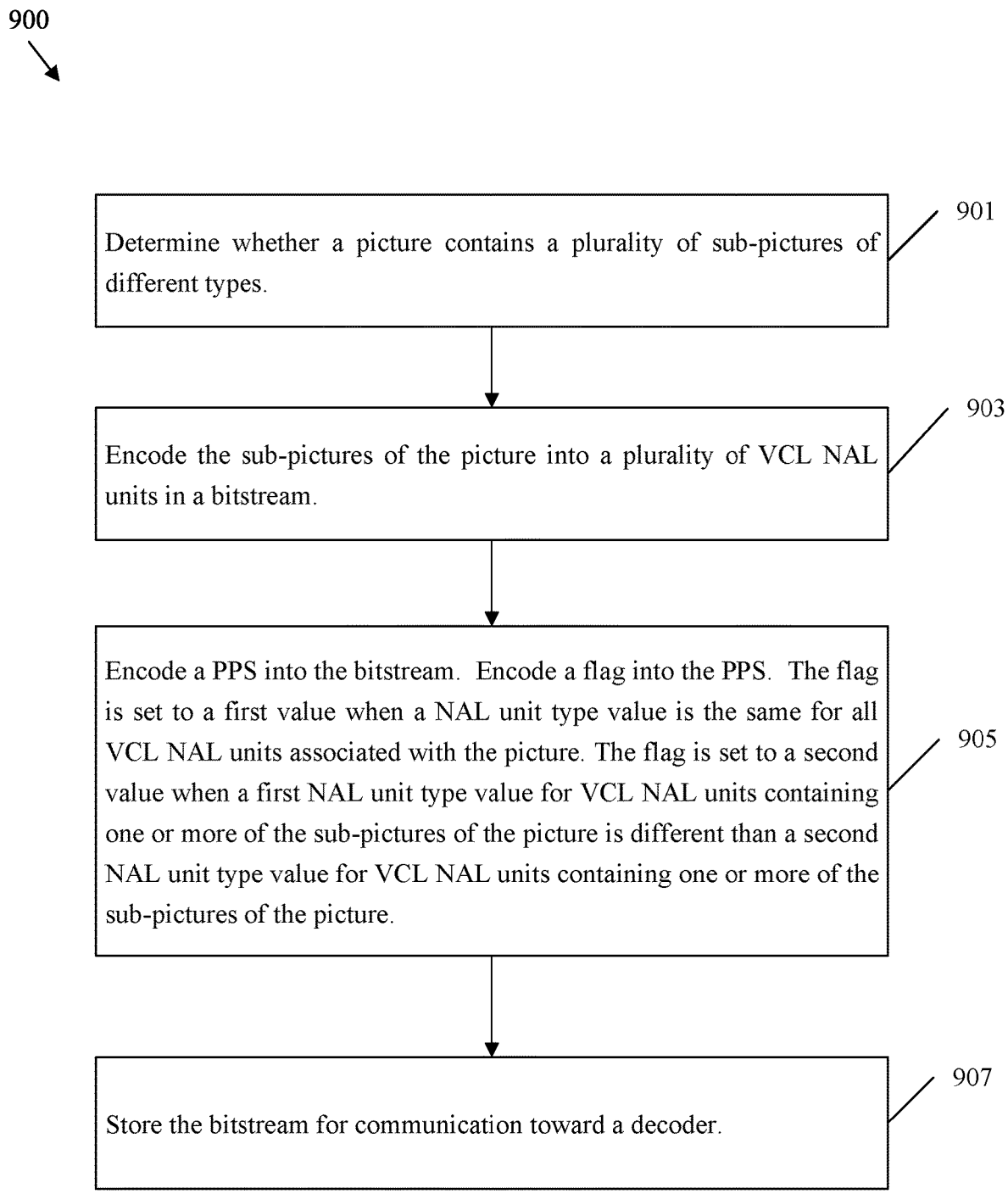
FIG. 9 is a flowchart of an example method of encoding a video sequence containing a picture with mixed NAL unit types into a bitstream.

FIG. 9 is a flowchart of an example method 900 of encoding a video sequence, such as CVS 500, containing a picture with mixed NAL unit types into a bitstream, such as a bitstream 700 including VR picture video stream 600 merged from multiple sub-picture video streams 601-603 at a plurality of video resolutions. Method 900 may be employed by an encoder, such as a codec system 200, an encoder 300, and/or a video coding device 800 when performing method 100.

Method 900 may begin when an encoder receives a video sequence including a plurality of pictures, such as VR pictures, and determines to encode that video sequence into a bitstream, for example based on user input. At step 901, the encoder determines whether a current picture contains a plurality of sub-pictures of different types. Such types may include at least one slice of the picture containing a portion of an IRAP sub-picture and at least one slice of the picture containing a portion of a non-IRAP NAL sub-picture. At step 903, the encoder encodes slices of the sub-pictures of the picture into a plurality of VCL NAL units in a bitstream. Such VCL NAL units may include one or more IRAP NAL units and one or more non-IRAP NAL units. For example, the encoding step may include merging sub-bitstreams of different resolutions into a single bitstream for communication to a decoder.

At step 905, the encoder encodes a PPS into the bitstream and encodes a flag into the PPS in the bitstream. As a specific example, encoding the PPS may include altering a previously encoded PPS to include a flag value, for example in response to a merging of sub-bitstreams. The flag may be set to a first value when a NAL unit type value is the same for all VCL NAL units associated with the picture. The flag may also be set to a second value when a first NAL unit type value for VCL NAL units containing one or more of the sub-pictures of the picture is a different than a second NAL unit type value for VCL NAL units containing one or more of the sub-pictures of the picture. For example, the first NAL unit type value may indicate the picture contains an IRAP sub-picture, and the second NAL unit type value may indicate that the picture also contains a non-IRAP sub-picture. Further, the first NAL unit type value may be equal to one of IDR_W_RADL, IDR_N_LP, or CRA_NUT. In addition, the second NAL unit type value may be equal to one of TRAIL_NUT, RADL_NUT, or RASL_NUT. As a specific example, the flag may be a mixed_nalu_types_in_pic_flag. In a specific example, the mixed_nalu_types_in_pic_flag may be set equal to one in order to specify that each picture that refers to the PPS containing the flag has more than one VCL NAL unit. Further, the flag specifies that the VCL NAL units associated with the corresponding picture do not all have the same value of NAL unit type (nal_unit_type). In another specific example, the mixed_nalu_types_in_pic_flag may be set equal to zero in order to specify that each picture that refers to the PPS containing the flag has one or more VCL NAL units. Further, the flag specifies that all the VCL NAL units of the corresponding picture have the same value of nal_unit_type.

At step 907, the encoder may store the bitstream for communication toward a decoder.

Figure 10:
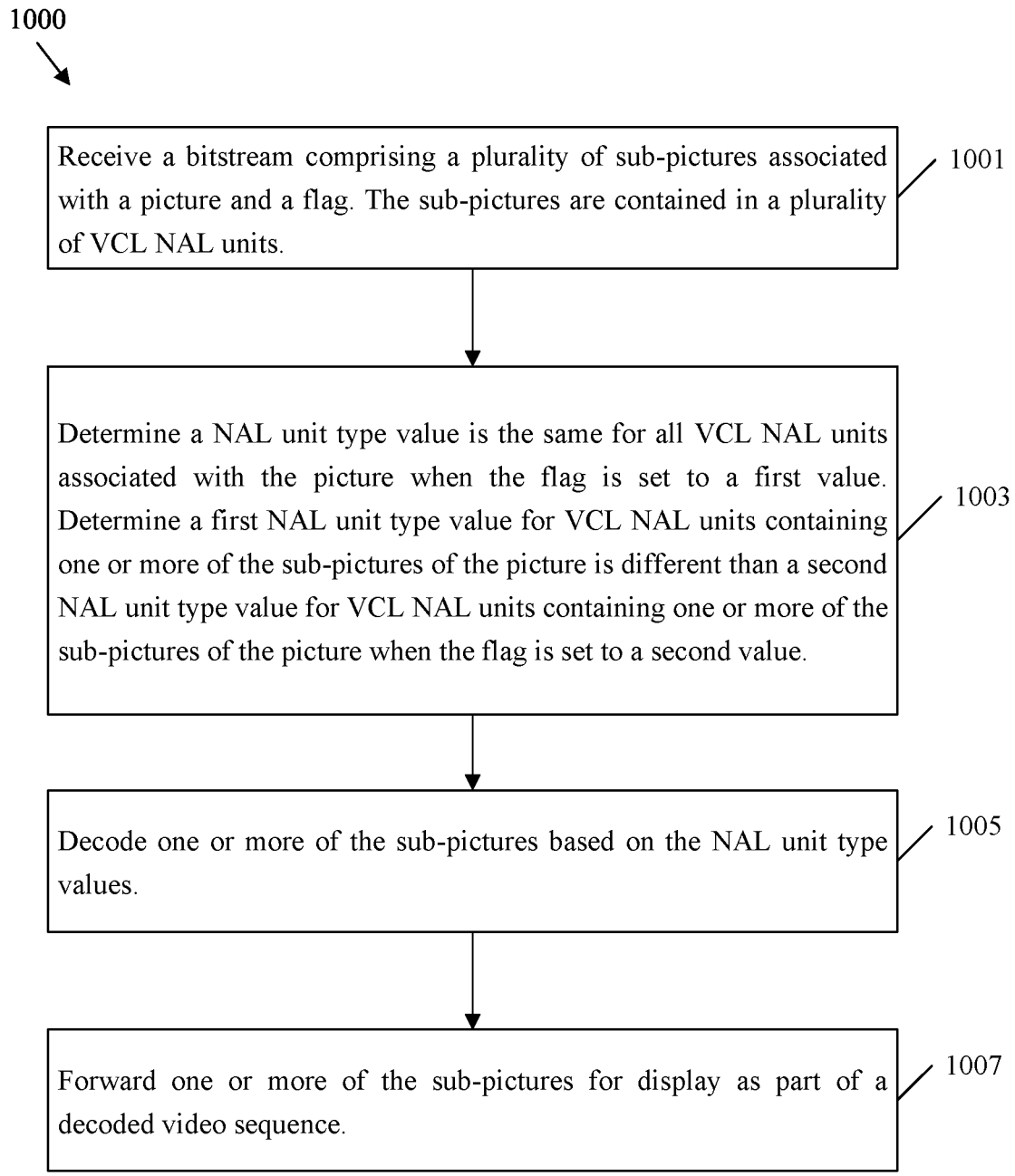
FIG. 10 is a flowchart of an example method of decoding a video sequence containing a picture with mixed NAL unit types from a bitstream.

FIG. 10 is a flowchart of an example method 1000 of decoding a video sequence, such as CVS 500, containing a picture with mixed NAL unit types from a bitstream, such as a bitstream 700 including VR picture video stream 600 merged from multiple sub-picture video streams 601-603 at a plurality of video resolutions. Method 1000 may be employed by a decoder, such as a codec system 200, a decoder 400, and/or a video coding device 800 when performing method 100.

Method 1000 may begin when a decoder begins receiving a bitstream of coded data representing a video sequence, for example as a result of method 900. At step 1001, the decoder receives a bitstream. The bitstream comprises a plurality of sub-pictures associated with a picture and a flag. As a specific example, the bitstream may comprise a PPS that includes the flag. Further, the sub-pictures are contained in a plurality of VCL NAL units. For example, slices associated with the sub-pictures are included in the VCL NAL units.

At step 1003, the decoder determines a NAL unit type value is the same for all VCL NAL units associated with the picture when the flag is set to a first value. Further, the decoder determines a first NAL unit type value for VCL NAL units containing one or more of the sub-pictures of the picture is different than a second NAL unit type value for VCL NAL units containing one or more of the sub-pictures of the picture when the flag is set to a second value. For example, the first NAL unit type value may indicate the picture contains an IRAP sub-picture, and the second NAL unit type value may indicate that the picture also contains a non-IRAP sub-picture. Further, the first NAL unit type value may be equal to one of IDR_W_RADL, IDR_N_LP, or CRA_NUT. In addition, the second NAL unit type value may be equal to one of TRAIL_NUT, RADL_NUT, or RASL_NUT. As a specific example, the flag may be a mixed_nalu_types_in_pic_flag. The mixed_nalu_types_in_pic_flag may be set equal to one when specifying that each picture referring to the PPS has more than one VCL NAL unit and the VCL NAL units do not have the same value of NAL unit type (nal_unit_type). Also, the mixed_nalu_types_in_pic_flag may be set equal to zero when each picture referring to the PPS has one or more VCL NAL units and the VCL NAL units of each picture referring to the PPS have the same value of nal_unit_type.

At step 1005, the decoder may decode one or more of the sub-pictures based on the NAL unit type values. The decoder may also forward one or more of the sub-pictures for display as part of a decoded video sequence at step 1007.

Figure 11:
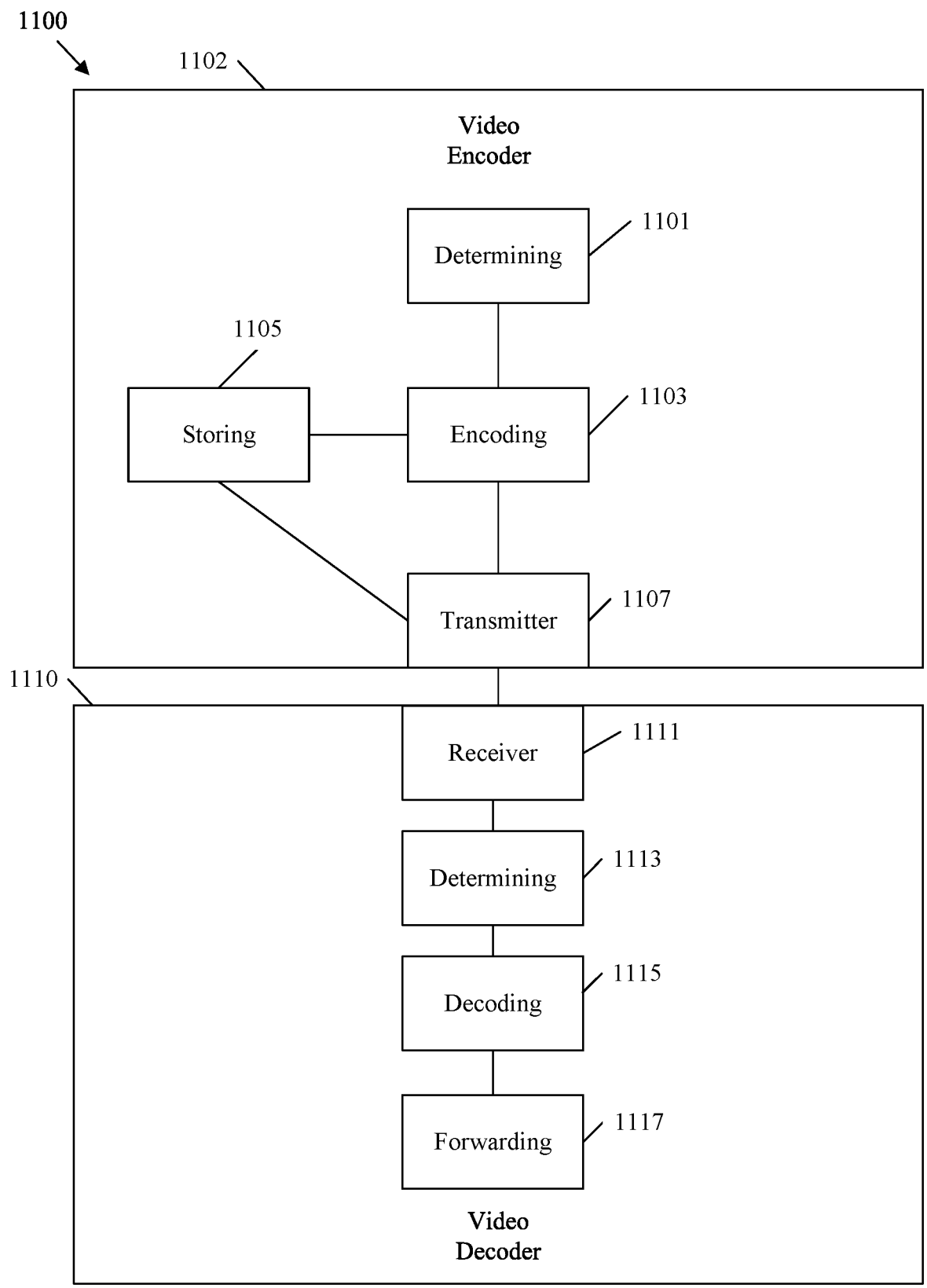
FIG. 11 is a schematic diagram of an example system for coding a video sequence containing a picture with mixed NAL unit types into a bitstream.

FIG. 11 is a schematic diagram of an example system 1100 for coding a video sequence, such as CVS 500, containing a picture with mixed NAL unit types into a bitstream, such as a bitstream 700 including VR picture video stream 600 merged from multiple sub-picture video streams 601-603 at a plurality of video resolutions. System 1100 may be implemented by an encoder and a decoder such as a codec system 200, an encoder 300, a decoder 400, and/or a video coding device 800. Further, system 1100 may be employed when implementing method 100, 900, and/or 1000.

The system 1100 includes a video encoder 1102. The video encoder 1102 comprises a determining module 1101 for determining whether a picture contains a plurality of sub-pictures of different types. The video encoder 1102 further comprises an encoding module 1103 for encoding the sub-pictures of the picture into a plurality of VCL NAL units in a bitstream. The an encoding module 1103 is further for encoding into the bitstream a flag set to a first value when a NAL unit type value is the same for all VCL NAL units associated with the picture and set to a second value when a first NAL unit type value for VCL NAL units containing one or more of the sub-pictures of the picture is different than a second NAL unit type value for VCL NAL units containing one or more of the sub-pictures of the picture. The video encoder 1102 further comprises a storing module 1105 for storing the bitstream for communication toward a decoder. The video encoder 1102 further comprises a transmitting module 1107 for transmitting the bitstream toward video decoder 1110. The video encoder 1102 may be further configured to perform any of the steps of method 900.

The system 1100 also includes a video decoder 1110. The video decoder 1110 comprises a receiving module 1111 for receiving a bitstream comprising a plurality of sub-pictures associated with a picture and a flag, wherein the sub-pictures are contained in a plurality of VCL NAL units. The video decoder 1110 further comprises a determining module 1113 for determining a NAL unit type value is the same for all VCL NAL units associated with the picture when the flag is set to a first value. The determining module 1113 is further for determining a first NAL unit type value for VCL NAL units containing one or more of the sub-pictures of the picture is different than a second NAL unit type value for VCL NAL units containing one or more of the sub-pictures of the picture when the flag is set to a second value. The video decoder 1110 further comprises a decoding module 1115 for decoding one or more of the sub-pictures based on the NAL unit type values. The video decoder 1110 further comprises a forwarding module 1117 for forwarding one or more of the sub-pictures for display as part of a decoded video sequence. The video decoder 1110 may be further configured to perform any of the steps of method 1000.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented in a decoder, the method comprising:
receiving a bitstream comprising a picture and a flag, wherein the picture is associated with a plurality of video coding layer (VCL) network abstraction layer (NAL) units, and wherein the flag is a mixed_nalu_types_in_pic_flag;
determining a NAL unit type value is the same for all of the VCL NAL units of the picture when the flag is set to a first value;
determining the VCL NAL units of the picture have a plurality of different NAL unit type values when the flag is set to a second value; and
decoding the picture based on the flag.

2. The method of claim 1, wherein the bitstream includes a picture parameter set (PPS) including the flag.

3. The method of claim 1, wherein the different NAL unit type values indicate the picture contains an intra-random access point (IRAP) VCL NAL unit and a non-IRAP VCL NAL unit.

4. The method of claim 1, wherein the different NAL unit type values include a first NAL unit type value equal to Instantaneous Decoding Refresh (IDR) with random access decodable leading picture (IDR_W_RADL), IDR with no leading pictures (IDR_N_LP), or clean random access (CRA) NAL unit type (CRA_NUT).

5. The method of claim 4, wherein the different NAL unit type values include a second NAL unit type value equal to trailing picture NAL unit type (TRAIL_NUT).

6. The method of claim 2, wherein the mixed_nalu_types_in_pic_flag is equal to one when specifying that each picture referring to the PPS has more than one VCL NAL unit and the VCL NAL units do not have the same value of NAL unit type (nal_unit_type), and wherein mixed_nalu_types_in_pic_flag is equal to zero when specifying that each picture referring to the PPS has one or more VCL NAL units and the VCL NAL units have the same value of nal_unit_type.

7. A method implemented in an encoder, the method comprising:
determining whether a picture contains a plurality of sub-pictures of different types;
encoding the sub-pictures of the picture into a plurality of video coding layer (VCL) network abstraction layer (NAL) units in a bitstream;
encoding into the bitstream a flag set to a first value when a first NAL unit type value is the same for all VCL NAL units associated with the picture and set to a second value when the first NAL unit type value for VCL NAL units containing one or more of the sub-pictures of the picture is different than a second NAL unit type value for VCL NAL units containing one or more of the sub-pictures of the picture, wherein the flag is a mixed_nalu_types_in_pic_flag; and
storing the bitstream for communication toward a decoder.

8. The method of claim 7, further comprising encoding a picture parameter set (PPS) into the bitstream, wherein the flag is encoded into the PPS.

9. The method of claim 7, wherein the first NAL unit type value indicates the picture contains an intra-random access point (IRAP) sub-picture, and wherein the second NAL unit type value indicates the picture contains a non-IRAP sub-picture.

10. The method of claim 7, wherein the first NAL unit type value is equal to Instantaneous Decoding Refresh (IDR) with random access decodable leading picture (IDR_W_RADL), IDR with no leading pictures (IDR_N_LP), or clean random access (CRA) NAL unit type (CRA_NUT).

11. The method of claim 7, wherein the second NAL unit type value is equal to trailing picture NAL unit type (TRAIL_NUT), random access decodable leading picture NAL unit type (RADL_NUT), or random access skipped leading picture (RASL) NAL unit type (RASL_NUT).

12. The method of claim 8, wherein the mixed_nalu_types_in_pic_flag is equal to one when specifying that the picture referring to the PPS has more than one of the VCL NAL units and the VCL NAL units do not have the same value of NAL unit type (nal_unit_type), and wherein mixed_nalu_types_in_pic_flag is equal to zero when specifying the picture referring to the PPS has one or more of the VCL NAL units and the VCL NAL units have the same value of nal_unit_type.

13. A decoder comprising:
a receiver configured to receive a bitstream comprising a picture and a flag, wherein the picture is associated with a plurality of video coding layer (VCL) network abstraction layer (NAL) units, wherein the flag is a mixed_nalu_types_in_pic_flag; and
a processor coupled to the receiver and configured to:
determine a NAL unit type value is the same for all of the VCL NAL units of the picture when the flag is set to a first value;
determine the VCL NAL units of the picture have a plurality of different NAL unit type values when the flag is set to a second value; and
decode the picture based on the flag.

14. The decoder of claim 13, wherein the bitstream includes a picture parameter set (PPS) including the flag.

15. The decoder of claim 13, wherein the different NAL unit type values include a first NAL unit type value equal to Instantaneous Decoding Refresh (IDR) with random access decodable leading picture (IDR_W_RADL), IDR with no leading pictures (IDR_N_LP), or clean random access (CRA) NAL unit type (CRA_NUT).

16. The decoder of claim 15, wherein the different NAL unit type values include a second NAL unit type value equal to trailing picture NAL unit type (TRAIL NUT).

17. The decoder of claim 14, wherein the mixed_nalu_types_in_pic_flag is equal to one when specifying that each picture referring to the PPS has more than one VCL NAL unit and the VCL NAL units do not have the same value of NAL unit type (nal_unit_type), and wherein mixed_nalu_types_in_pic_flag is equal to zero when specifying that each picture referring to the PPS has one or more VCL NAL units and the VCL NAL units have the same value of nal_unit_type.

18. A method implemented in a decoder, the method comprising:
receiving, by a receiver of the decoder, a bitstream comprising a plurality of sub-pictures associated with a picture and a flag, wherein the sub-pictures are contained in a plurality of video coding layer (VCL) network abstraction layer (NAL) units, wherein the flag is a mixed_nalu_types_in_pic_flag;

determining, by a processor of the decoder, that a first NAL unit type value that is the same for all of the VCL NAL units associated with the picture when the flag is set to a first value;

determining, by the processor, that a first NAL unit type value for a first set of the VCL NAL units containing one or more of the sub-pictures of the picture is different than a second NAL unit type value for a second set of the VCL NAL units containing one or more of the sub-pictures of the picture when the flag is set to a second value; and decoding, by the processor, one or more of the sub-pictures based on the first NAL unit type value or the second NAL unit type value.

19. The method of claim 18, wherein the bitstream includes a picture parameter set (PPS) including the flag.

20. The method of claim 18, wherein the first NAL unit type value is equal to Instantaneous Decoding Refresh (IDR) with random access decodable leading picture (IDR_W_RADL), IDR with no leading pictures (IDR_N_LP), or clean random access (CRA) NAL unit type (CRA_NUT).

21. The method of claim 18, wherein the different NAL unit type values include a second NAL unit type value equal to trailing picture NAL unit type (TRAIL_NUT).

22. The method of claim 19, wherein the mixed_nalu_types_in_pic_flag is equal to one when specifying that each picture referring to the PPS has more than one VCL NAL unit and the VCL NAL units do not have the same value of NAL unit type (nal_unit_type), and wherein mixed_nalu_types_in_pic_flag is equal to zero when specifying that each picture referring to the PPS has one or more VCL NAL units and the VCL NAL units have the same value of nal_unit_type.

* * * * *